(12) United States Patent
Smith et al.

(10) Patent No.: US 7,586,925 B2
(45) Date of Patent: *Sep. 8, 2009

(54) DATA ADAPTATION PROTOCOL

(75) Inventors: Mark Smith, Westford, MA (US); Shiping Li, Acton, MA (US); James Pasco-Anderson, Needham, MA (US)

(73) Assignee: Sonus Networks, Inc., Westford, MA (US)

( * ) Notice: Subject to any disclaimer, the term of this patent is extended or adjusted under 35 U.S.C. 154(b) by 988 days.

This patent is subject to a terminal disclaimer.

(21) Appl. No.: 10/658,352

(22) Filed: Sep. 9, 2003

(65) Prior Publication Data

US 2005/0053028 A1    Mar. 10, 2005

(51) Int. Cl.
*H04L 12/28* (2006.01)
(52) U.S. Cl. .................. 370/399; 370/389; 370/395
(58) Field of Classification Search ............ 370/389, 370/398, 399
See application file for complete search history.

(56) References Cited

U.S. PATENT DOCUMENTS

| | | |
|---|---|---|
| 5,936,967 A | 8/1999 | Baldwin et al. |
| 6,009,100 A | 12/1999 | Gausmann et al. |
| 6,125,117 A | 9/2000 | Martin et al. |
| 6,215,789 B1 | 4/2001 | Keenan et al. |
| 6,282,193 B1 | 8/2001 | Hluchyj |

(Continued)

FOREIGN PATENT DOCUMENTS

EP    1 176 774    1/2002

OTHER PUBLICATIONS

Office Action dated Jun. 13, 2007 for U.S. Appl. No. 10/658,053.

(Continued)

*Primary Examiner*—Phuc H Tran
(74) *Attorney, Agent, or Firm*—Proskauer Rose, LLP

(57) ABSTRACT

A gateway apparatus includes multiple network server cards which are synchronized with each other to allow time slot switching of synchronous data across an asynchronous medium between source and destination server cards. The gateway includes synchronization logic and a data adaptation layer which implements a protocol for formatting of synchronous serial data. The data undergoes serial to parallel conversion and is formed into per time slot subpackets which are further packetized along with context and synchronization data. The packet is transmitted through an asynchronous switch after which the packet is disassembled into its constituent subpackets and queued into play-out buffers according to each subpackets' associated context and synchronization data. The apparatus allows synchronous data to be switched from a source time slot to a destination time slot across the asynchronous switch with a known, fixed delay. The gateway apparatus requires only a single asynchronous switch to transmit data between and among both the synchronous and asynchronous domains.

18 Claims, 15 Drawing Sheets

U.S. PATENT DOCUMENTS

| | | | |
|---|---|---|---|
| 6,381,238 | B1 | 4/2002 | Hluchyj |
| 6,466,572 | B1 | 10/2002 | Ethridge et al. |
| 6,507,584 | B1 * | 1/2003 | Moriwaki et al. ........... 370/398 |
| 6,577,623 | B1 | 6/2003 | Kawai et al. |
| 6,836,479 | B1 * | 12/2004 | Sakamoto et al. ........... 370/389 |
| 6,999,413 | B2 * | 2/2006 | Moriwaki et al. ........... 370/228 |
| 7,126,957 | B1 * | 10/2006 | Isukapalli et al. ........... 370/412 |
| 2003/0007502 | A1 | 1/2003 | Dove et al. |
| 2004/0131080 | A1 | 7/2004 | Ito |
| 2004/0141494 | A1 | 7/2004 | Beshai et al. |

OTHER PUBLICATIONS

European Search Report for International Application No. PCT/US2004/029139, Date of Mailing Mar. 26, 2009 (3 pages).

International Search Report for International Application No. PCT/US2004/029139, Date of Mailing Apr. 6, 2005, (3 pages).

Written Opinion for International Application No. PCT/US2004/029139, Date of Mailing Apr. 6, 2005, (3 pages).

* cited by examiner

DATA ADAPTATION PROTOCOL

RELATED APPLICATIONS

This application is one of two related applications filed on an even date herewith and commonly assigned, including U.S. patent application Ser. No. 10/685,053, entitled "METHOD AND APPARATUS FOR SYNCHRONIZED TRANSPORT OF DATA THROUGH AN ASYNCHRONOUS MEDIUM", the subject matter of which is incorporated herein by reference for all purposes.

FIELD OF THE INVENTION

The invention relates, generally, to communications systems, and, more specifically, to a gateway apparatus which utilizes a single switch to route both synchronous and asynchronous data streams.

BACKGROUND OF THE INVENTION

Two fundamentally different switching technologies exist that enable telecommunications. First, circuit-switching technology utilizes dedicated lines or channels to transmit data between two points, similar to public switched telephone networks (PSTN). The second, packet switching technology, utilizes a "virtual" channel to establish communications between two points. The virtual communication channel is shared by multiple communication processes simultaneously and is only utilized when data is to be transmitted. Since the differing performance requirements for voice transmission and data transmission impose different design priorities, historical development of voice communication systems such as the telephone, and its related business systems, such as a corporate business telephone system, e.g. Public Branch Exchange (PBX) and Automatic Call Distribution (ACD), has centered on circuit switching technology. Conversely, data communication systems, such as Local Area Networks (LANs), Wide Area Networks (WANs) and the Internet have primarily relied upon packet switching technology. As a result, separate cultures and networking fabrics have evolved for the design, development, application, and support for real-time voice communications, e.g. circuit switched networks, and non real-time data transmission, e.g. packetized data networks.

Because of the inherent differences in circuit-switched networked topologies and packetized network topologies, an apparatus know as a gateway is used to facilitate the exchange of signals and data between circuit-switched networks and packet-switched networks. Examples of such apparatus can be found in U.S. Pat. Nos. 6,282,193, and 6,631,238, both assigned to Sonus Networks, Inc. of Westford, Mass. Circuit-switched circuits operate in a synchronized manner and are typically switched from one Time Division Multiplexed (TDM) channel to another using a TDM switch to maintain synchronicity. Conversely, packetized networks, such as IP networks and ATM networks, operate in an asynchronous manner and are typically switched from one packetized channel to another with an asynchronous packet switch. As such, prior art gateways that facilitated switching within the synchronous domain and asynchronous domain, as well as cross-switching between the synchronous and asynchronous domains, required both a Time Division Multiplexed (TDM) switch for synchronous data and a packet switch for asynchronous data.

FIG. 1 illustrates a prior art gateway apparatus 100 that interconnects a circuit-switched network 202 and a packet-switched network 204 and facilitates the transmission of data within the packet-switched and circuit-switched domains, as well as across such domains. As shown, apparatus 100 comprises a packet switch 210, a time division multiplexed switch 112, packet integration logic 214, and a plurality of separate cards 205A-N each of which is capable of functioning as a source or destination of information associated with a time slot in the system. The TDM interface logic 219 of each card 205A-N is connected to circuit-switched network 202 by TDM Trunks 201. The TDM Trunks 201 represent implementations of standard telecom interfaces. TDM interface logic 219 comprises framers and mappers that may be used to implement various telecommunication protocols in a known manner and format data stream into virtual DS0 lines. The PAD logic 212 functions as packet adaptation logic which may be implemented with DSPs in a known manner. FIG. 1, TDM Highways 209 interconnect PAD logic 212 and TDM interface logic 219 with the Time Slot Interconnect (TSI) logic 213.

Time Slot Interchange logic 213 allows the serial data from one virtual DS0 line to be switched to another virtual DS0 line on a byte by byte level. Since a TDM data stream is a byte multiplexed synchronous serial data stream, the stream may be switched from one channel to another using the TDM switch 112 and the appropriate Time Slot Interconnect logic 213. If the TDM stream is to be converted to a packet destination, the Time Slot Interconnect logic 213 output is provided via another TDM highway 209 to a Packet Adaptation Layer (PAD) 212, which functions to build a packet from the DS0 data stream. The packetized data is then forwarded to the packet switch 210 within the gateway 100 after which it is then forwarded to a packet interface 214 and onto a destination within a packet network topology 204. Accordingly, prior art gateways require two switches, both a TDM switch 112 and a packet switch 212, to switch data between and among the circuit domain and the packet domain. Such dual switch architectures increase the costs of the apparatus.

FIG. 2 illustrates another prior art gateway apparatus 150, similar to apparatus 100 of FIG. 1, except that the Time Slot Interconnect logic 213 and the TDM switch 112 have been eliminated. As such, gateway 150 performs all switching asynchronously through the packet switch 212. Gateway apparatus 150 is simpler in design but is not capable of synchronous transmission of data. In FIG. 2, TDM Highways 209 connect DSPs used to implement PAD logic 212 directly to framers, and mappers used to implement TDM interface logic 219.

In addition, there exists protocols for streaming time sensitive data, such as audio and video communications. One such protocol is the IETF Real Time Protocol (RTP) which has a fixed delay between the source and the recipient, however, such delay is an unknown quantity. With an unknown fixed delay it is not possible to efficiently transport data through an asynchronous medium.

Various attempts have been made in the past to solve synchronization problems over wide area network through protocols that allow out of band distribution of information. One such protocol in described in U.S. Pat. No. 5,936,967, Baldwin et al., entitled "Multi-Channel Broadband Adaptation Processing," and assigned to Lucent Technologies. Another such protocol, known as AAL1, is defined in published specifications entitled ITU-T I.363.1 "B-ISDN ATM Adaptation Layer specification: Type 1 AAL", August, 1996; and ATM AAL1 Dynamic Bandwidth Circuit Emulation Service, AF-VTOA-0085.000, July, 1997. Revisions to the AAL1protocol, known as AAL2, is defined in published specifications entitled ITU-T I.363.2, ATM Adaptation Layer 2 (AAL2). The above-identified protocols, however, are intended for use with wide area applications and do not include synchronization information. Accordingly, these protocols are not suitable for internal synchronization of data across an asynchronous medium with a known constant and same delay.

Accordingly, a need exists for a gateway apparatus and protocol which is capable of efficiently switching data between and among the circuit domain and the packet domain.

A further a need exists for a gateway apparatus and protocol that is suitable for internal synchronization of data across an asynchronous medium with a known constant and same delay.

A further need exists for a gateway apparatus and protocol which is capable of efficiently switching data between and among the circuit domain and the packet domain.

A further need exists for a gateway apparatus and protocol which is capable of switching both asynchronous and synchronous data utilizing a single switch.

Yet another exists for a gateway apparatus and protocol in which all synchronous and asynchronous data is formatted using a common protocol to allow for efficient transport of the data with a fixed delay through an asynchronous medium.

Yet another exists for a gateway apparatus and protocol in which all synchronous and asynchronous data is formatted using a common protocol that allows of the data to be transported with synchronization information through an asynchronous medium.

Yet another need exists for a gateway apparatus which reduces the costs of the apparatus.

SUMMARY OF THE INVENTION

The invention discloses an apparatus and technique that allows for both TDM to TDM time slot switching and TDM to packet time slot switching within a gateway using only a single packet switch. The packet switch performs all switching, including TDM to TDM and TDM to packet. Since a packet switch is inherently asynchronous and the data coming from the TDM domain is synchronous, special circuitry, referred to as Synchronous Aggregation Logic (SAL) facilitates the orderly formatting and synchronized transmission of synchronous data across the asynchronous switch. The gateway apparatus includes multiple network server cards which are synchronized with each other and the network to allow for time slot switching between a source server card and a destination server card. Synchronization logic generates a special clock signal defining a fixed number of synchronization intervals during which serial to parallel data conversion and subpacketization occur.

In accordance with the inventive protocol, multiple streams of synchronous data, representing an even larger number of source time slots, are converted using serial-to-parallel converters, into subpackets each having multiple bytes. Each subpacket is associated with a single source time slot. The subpackets are then stored in ingress data memory which serves as per time slot packet buffers. A processor within the network server card maintains a context table which matches source time slots with destination time slots and their relative egress queues. Such "context" information is stored in a table. The context includes a destination queue ID used to control which switch port the data will be sent to, and a destination time slot ID used to select the time slot on the destination card that will receive the data.

All subpackets assembled within a synchronization interval along with their respective context data are forwarded to one or more ingress queues and are assembled into packets. Ingress control state machine logic controls the timely reading of completed subpackets from the ingress data memory to the ingress queues. If the enable bit associated with a subpacket is not enabled, the data is discarded. Otherwise, the subpackets and their associated context are formed into packets in the ingress queues. In addition, each packet has associated therewith data identifying the synchronization interval in which the subpackets were created, e.g. a synchronization tag, and data identifying the number of subpackets contained within the packet. Once the subpackets have been formed within a synchronization interval, upon transference to the ingress queues for formation into packets, the act of formation of packets, as well as their transmission from an ingress queue, across the asynchronous port, and to an egress queue, occurs asynchronously using a asynchronous clock.

In the illustrative embodiment, the ingress queue identifier has a one to one correspondence with the egress queue identifier and a port identifier on the asynchronous switch. Accordingly, only a single identification variable is needed within the context associated with the subpacket to identify its ingress queue, its egress queue and the switch port to which the data will be provided. The data is transmitted asynchronously across the switch to an egress queue, and from there, under the control, of egress state machine logic, the packets are disassembled into its individual subpackets and read into an egress data memory which includes a segment of partitioned memory referred to as a "play-out buffer" for each time slot within the system.

The destination time slot identifier data associated with a particular subpacket identifies which play-out buffer within an egress data RAM the subpacket is read into. The synchronization tag determines the position within the play-out buffer in which the subpacket will be written. In the illustrative embodiment, there are only four different synchronization intervals. Subpackets are read into a position of a respective play-out buffer with a two interval offset. For example, subpackets constructed during synchronization interval zero will be placed within a play-out buffer at synchronization interval two. In this manner, the subpackets are always played-out or converted from parallel data into serial synchronous data with a fixed delay, i.e., two synchronization intervals. In this manner, the system designer may optimize the number of synchronization intervals and the offset necessary for the synchronous data to be transported through the asynchronous medium. As a result, synchronous data from the ingress side is transported through an asynchronous switch and onto an egress side with a constant, fixed delay. As such the synchronocity of the data is maintained. The use of a synchronization tag at the source eliminates the need for context at the destination.

According to a first aspect of the invention, a method for processing data comprises: (a) converting a stream of synchronous serial data associated with a source time slot into a plurality of parallel data units; (b) constructing at least one subpacket in memory from the plurality of parallel data units; (c) storing memory context information, including a destination time slot identifier, for each subpacket associated with the source time slot; (d) constructing a data packet in memory, the data packet including at least one synchronization tag, a plurality of subpackets, and the respective memory context information associated with each of the subpackets; and, (e) providing the data packet to a receiving mechanism.

According to a second aspect of the invention, a method for processing data comprises: (a) converting a plurality of synchronous serial data streams, each associated with a source time slot, into parallel data units; (b) constructing, in ingress memory, at least one subpacket from the parallel data units associated with one of the source time slots, (c) retrieving ingress context data associated with the subpacket, the ingress context data comprising a destination time slot identifier, a queue identifier, and an enable variable; (d) constructing, in each of a plurality of queues, a data packet from subpackets and ingress context data associated with multiple source time slots, the subpackets within a packet completed within a synchronization interval, the data packet further comprising i) at least one synchronization tag, and ii) data identifying the number of subpackets contained in the packet; and (e) upon completion of a data packet, providing the data packet to the receiving mechanism.

According to a third aspect of the invention, a method for processing data comprises: (a) providing an apparatus having an asynchronous switch and synchronization logic for routing synchronous signals among a synchronous network interface and an asynchronous network interface; (b) receiving a plurality synchronous serial data streams each from a different source time slot; (c) constructing a data packet from a plurality of subpackets each derived from one the synchronous serial data streams and a respective memory context associated with each subpacket; and (d) routing the packet through the asynchronous switch to one of the asynchronous network interface and the synchronous network interface.

According to a fourth aspect of the invention, a method for processing data comprises: (a) receiving a data packet comprising a plurality of subpackets and ingress context data associated with multiple source time slots, the subpackets within the data packet completed within a synchronization interval, the data packet further comprising i) at least one synchronization tag identifying the synchronization interval, and ii) data identifying the number of subpackets contained in the packet; (b) writing a subpackets into one of a plurality of playout buffers within an egress memory based on context data associated with the subpacket; (c) writing the subpacket to a position within one of the plurality of playout buffers in accordance with the synchronization interval identified by the synchronization tag plus a fixed address offset; and (d) sequentially reading the subpackets from the playout buffer.

BRIEF DESCRIPTION OF THE DRAWINGS

The above and further advantages of the invention may be better understood by referring to the following description in conjunction with the accompanying drawings in which.

DETAILED DESCRIPTION

Figure 1:
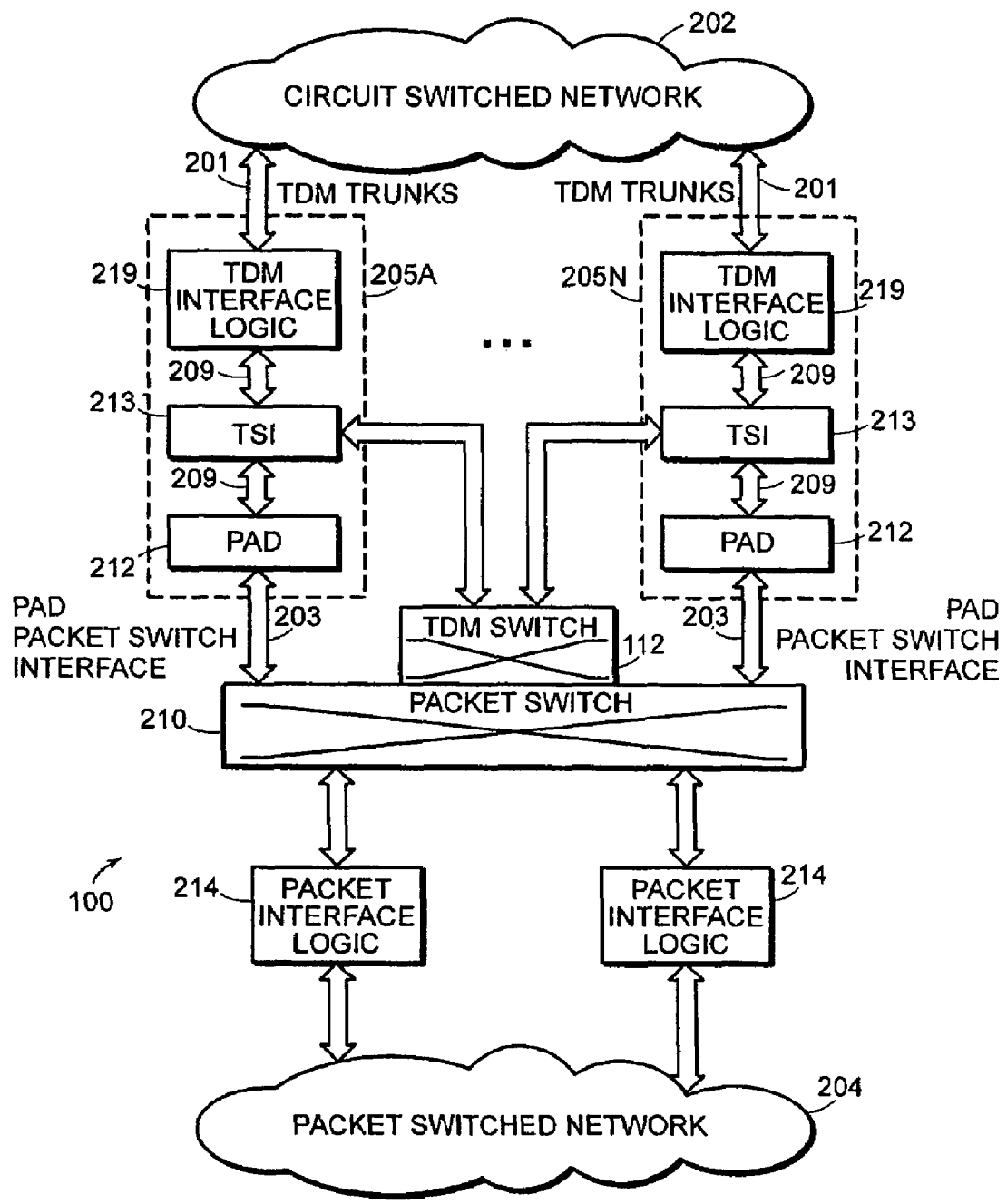
FIG. 1 illustrates conceptually a block diagram of a prior art gateway and the network environment in which it is typically utilized.
Figure 2:
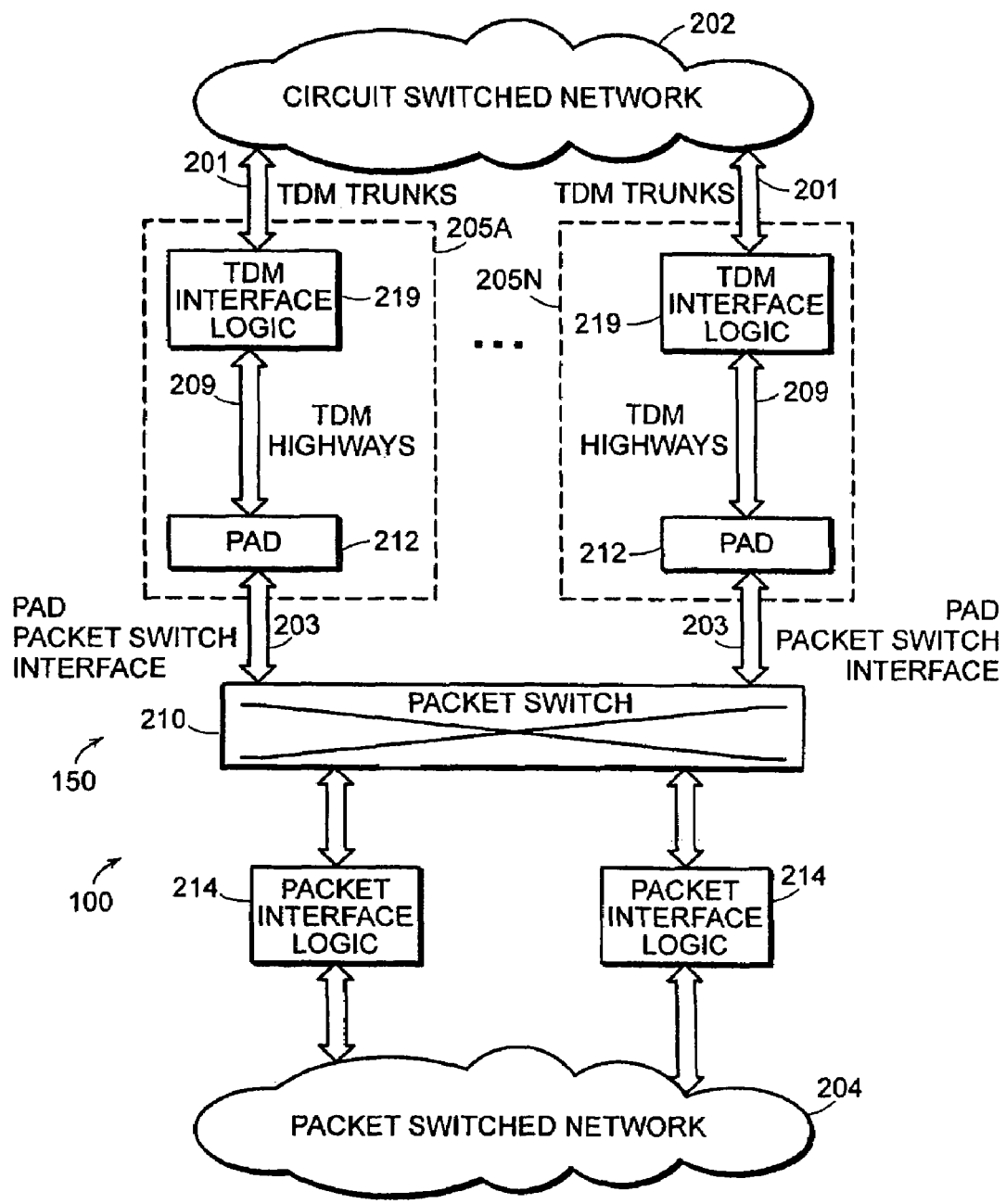
FIG. 2 illustrates conceptually a block diagram of the functional components a prior art gateway.
Figure 3:
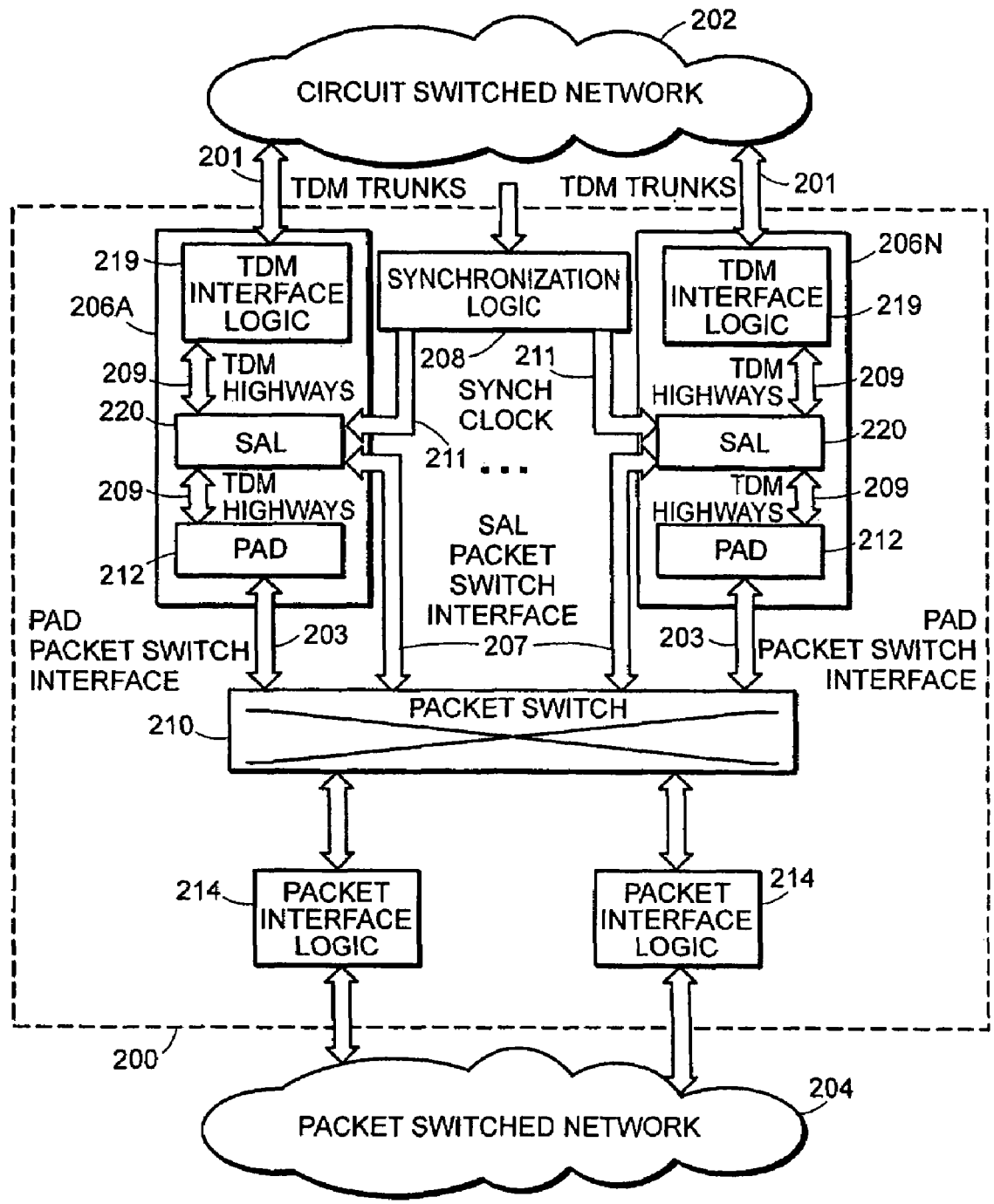
FIG. 3 illustrates conceptually a block diagram of the functional components of a gateway in accordance with the present invention.

An apparatus in accordance with an illustrative embodiment of the present invention is illustrated in FIG. 3. Apparatus 200 interconnects circuit-switched network 202 and packet-switched network 204 and facilitates the transmission of data within the packet-switched and circuit-switched domains, as well as across such domains. Apparatus 200 comprises a plurality of network server modules 206A-N, synchronization logic 208 and an asynchronous switch 210. Apparatus 200 further comprises Packet interface logic 214 that interconnects asynchronous switch 210 to packet network 204.

Since synchronization is critical for controlling delay through the system and maintaining alignment of data from separate time slots, the synchronization logic 208 of apparatus 200 provides a special synchronization clock signal to all server modules 206A-N. Such synchronization clock signal is different from a network clock signal or the clock signal used by the asynchronous switch 210. In the illustrative embodiment, synchronization logic 208 may be implemented on a separate card within apparatus 200 and generates the special synchronization clock, which, in the illustrative embodiment, may have a frequency of approximately 500 Hz and may be derived from and/or synchronized to the synchronous digital hierarchy within the circuit switched network 202 environment. As explained hereinafter, this clock signal frequency defines the synchronization intervals, that is, the equivalent time necessary to construct a single subpacket, e.g. four bytes, as explained hereinafter in greater detail. In addition, synchronization logic 208 generates a second, faster clock signal that is utilized by timers on each of server modules 206A-N to generate internal clock signals within of the each server modules. Other clock signal frequencies of the system designer's choice may also be used to define the synchronization intervals in accordance with the present invention.

As illustrated in FIG. 3, each of server modules 206A-N comprises TDM interface logic 219, TDM Highways 209, Synchronous Aggregation Logic (SAL) logic 220, and packet adaptation (PAD) logic 212. TDM interface logic 219 of each card 206A-N is connected to circuit-switched network 202 by TDM Trunks 201. As described previously, the TDM Trunks 201 represent implementations of standard telecom interfaces. The TDM interface logic 219 shown in FIGS. 3-4 may be implemented with off the shelf components such as framers, mapper, etc., in a known manner, to format data from network 202 into standard telecom interfaces, such as OC3, DS3, T1, E1, E3, etc., resulting a plurality of virtual DS0 links. In FIGS. 1-4, the TDM interface logic modules 219 may be implemented as data framers. Each DS0 link or channel produces a single byte per frame. In the illustrative embodiment, each frame is 125 usec. Each of the DS0 links may be a 64 k bit synchronous byte serial transport medium, and is coupled to Time Division Multiplex (TDM) logic 218 by TDM Highways 209, as illustrated. As explained hereinafter, the TDM logic 218 converts the serial synchronous data streams into parallel bytes for use by the Synchronous Aggregation Logic (SAL) logic 220. The output from the SAL logic 220 may be supplied either to packet adaptation (PAD) logic 212 or forwarded directly to asynchronous switch 210. The PAD logic 212 shown in FIGS. 3-4 functions as packet adaptation logic which may be implemented with DSPs in a known manner.

Synchronous Aggregation Logic

Figure 4:
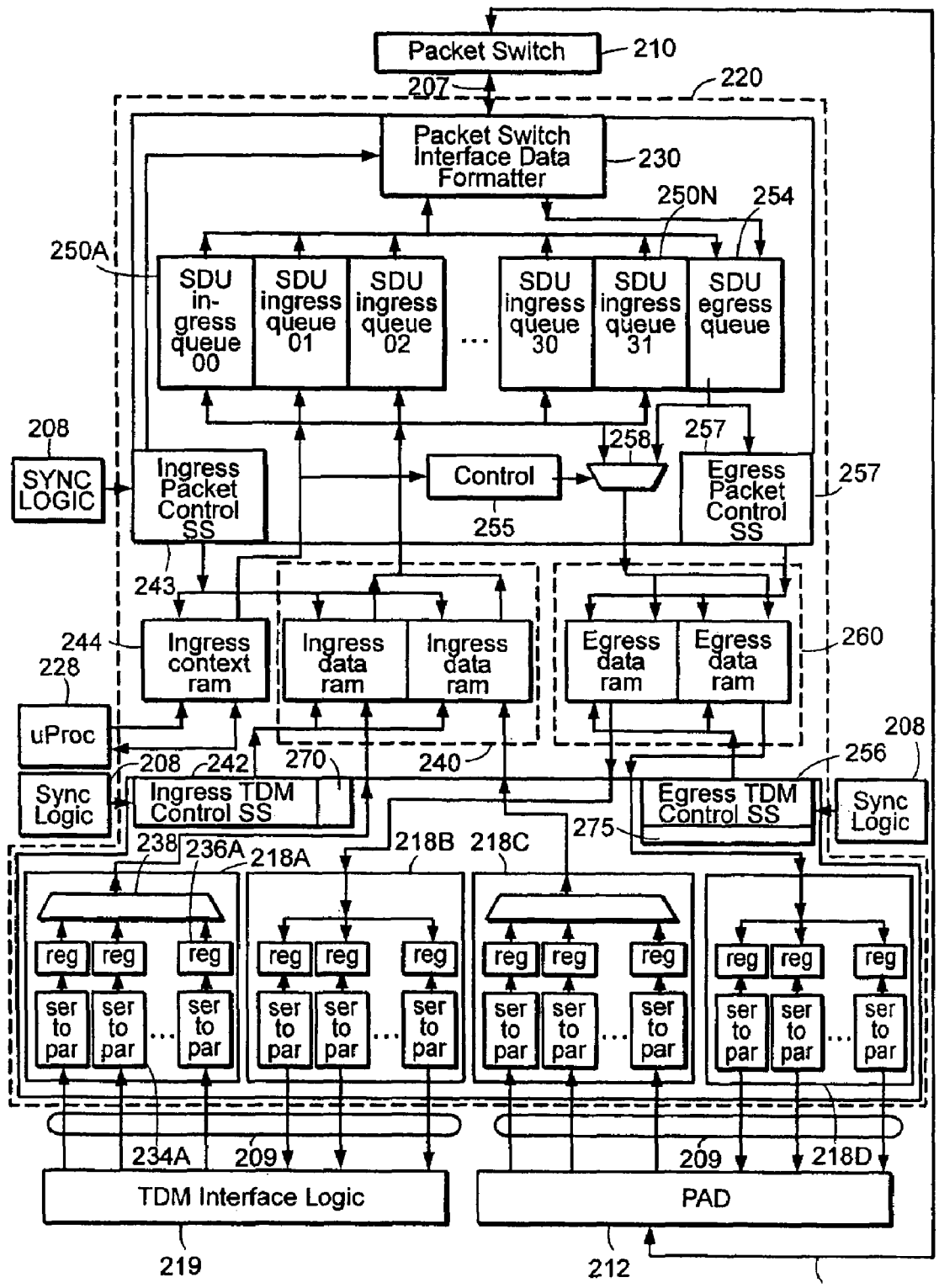
FIG. 4 illustrates conceptually a logic diagram of the functional components of a network server module including the Synchronous Aggregation Logic in accordance with the present invention.

FIG. 4 illustrates in greater detail the elements of the SAL logic 220 of each network servers 206A-N. In FIG. 4, all logic, except for the Packet Switch 210, Sync Logic 208, uProc 228, TDM Interface Logic 219, and PAD 212, is part of the Synchronous Aggregation Logic (SAL) 220. Logic modules 218A, 218B, 218C, and 218D are part of the SAL logic 220 and interface to the TDM Highways 209.

Each of 218A and 218C includes a plurality of serial-to-parallel converters 234A-N in sequence, respectively, with registers 236A-N. Each of converters 234 of module 218A is connected to TDM interface logic module 219. Each of converters 234 of module 218C is connected to PAD logic 212. Interface logic modules 218A and 218C convert each of the serialized synchronous data stream from DS0 links into a plurality of parallel data units. In the illustrative embodiment, parallel data units are sized as 8-bit bytes, however, other size data units, including 4-bit, 16-bit, or 32-bit, etc., data units may be similarly utilized. Registers 236A-N are coupled to a multiplexer 238. The output of multiplexer 238 serves as the output of TDM interface logic module 218 and is coupled to SAL logic 220.

In the illustrative embodiment, in addition to logic modules 218A, 218B, 218C, and 218D SAL logic 220 comprises ingress data memory 240, ingress control logic 242, ingress context memory 244, ingress queues 250A-N, egress queue 254, control logic 255, ingress packet control state machine logic 243, egress packet control state machine logic 257, multiplexer 258, and egress data memory 260, as explained hereafter in greater detail.

The output of multiplexer 238 in DS0 byte format servers as the output of each respective TDM logic modules 218A and 218C and is synchronously clocked into an ingress data memory 240 under the control of ingress control logic 242. In the illustrative embodiment, control logic 242 may be implemented as a hardware state-machine. Ingress control logic 242 utilizes multiple counters to sequentially generate the appropriate indices or memory addresses for ingress data memory 240 so that a subpacket for every time slot within network server 206 is generated every synchronization interval. In the illustrative embodiment, ingress data memory 240 is implemented with a pair of dual port data RAMs. It will be obvious to those reasonably skilled in the arts that memory 240 may be implemented with a single partitioned memory or multiple memory devices.

Data output from SAL logic 220 is supplied to a switch interface 230 which formats the data into a form acceptable by asynchronous switch 210. In the illustrative embodiment, switch interface 230 and asynchronous switch 210 may be implemented with Xilinx field programmable gate array and standard memory devices, or commercially available asynchronous switch products and interfaces.

Figure 5:
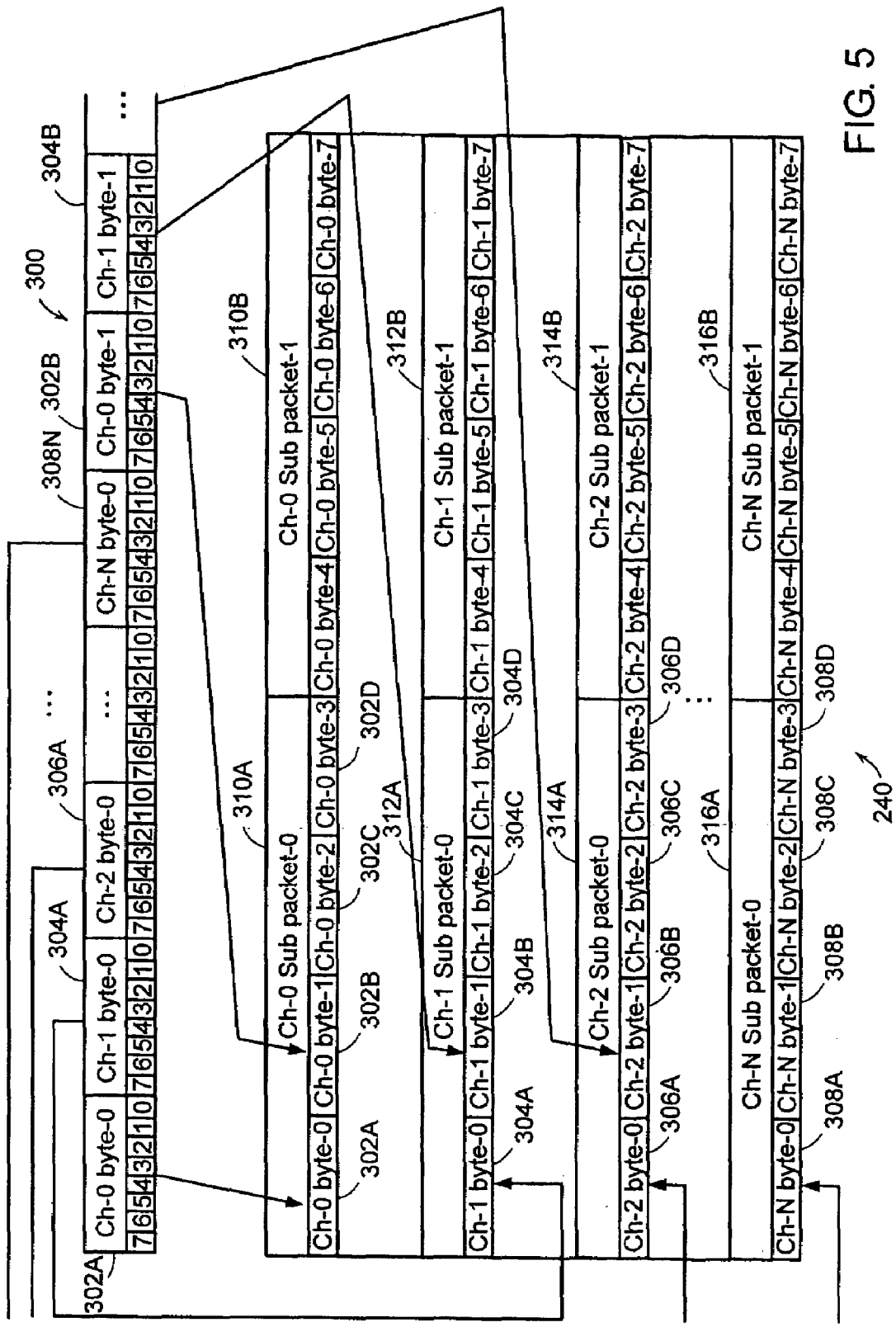
FIG. 5 illustrates conceptually the relationship a serial synchronous data stream and the subpackets formed therefrom in accordance with the present invention.

FIG. 5 illustrates the relationship between a conceptual serialized synchronous data stream 300 and the subpackets formed therefrom in ingress data memory 240 in accordance with the present invention. In FIG. 5, the legend abbreviation (Ch) for channel is used interchangeably to mean a time slot. As described previously, each of DS0 links provides a stream of serial synchronized data. Within this data stream, data from multiple source time slots is present. For example, in a network server module 206 which is capable of managing approximately 16,000 time slots, approximately 128 DS0 links may be present, each of which may accommodate the serial data for approximately 128 time slots within the system. It will be obvious to those reasonably skilled in the arts that any number of DS0 links may be used with a server module 206 and that any number of time slots within the system may be handled by a DS0 link as determined by the system designer.

The conceptualized data stream 300 represents the synchronous serial input (bits 0-7) and the converted output of TDM logic 218A or 218C in accordance with the present invention. Specifically, stream 300 includes byte 0, byte 1, byte 2, byte 3 . . . byte-N, for each of the channels or time slots handled by a module of TDM logic 218. However, such bytes are not sequential, but are interleaved with the bytes of the other time slots as illustrated. Specifically, byte-0 for all channels 1-N, is read and converted, followed by byte 1 for all channels 1-N, followed by byte-2 for all channels 1-N, etc. Within ingress data memory 240 multiple bytes from the same source time slot are assembled into a subpacket. In this manner, subpackets for multiple channels or time slots may be assembled simultaneously within a synchronization interval, as explained hereinafter.

As illustrated in FIG. 5, a byte 302A from stream 300, corresponding to Ch-0 byte-0, is formed by TDM logic 218 and multiplexed into ingress data memory 240 where it becomes part of subpacket 310A, representing Ch-0, subpacket-0. Similarly, byte 304A, representing Ch-1 byteo is generated by TDM logic 218 and multiplexed into ingress memory 240 as part of subpacket 312A, representing Ch-1, subpacket-0. Byte 306A and 308N are similarly generated and multiplexed into ingress memory 240 as part of subpackets 314A and 316A, respectively. Once byte-0 for each of the channels Ch-0 to Ch-N has been read into its respective subpacket, byte-1 for each of the respective channels Ch-0 to Ch-N are multiplexed into ingress data memory 240 during construction of the subpackets. Specifically, byte 302B, representing Ch-0 byte-1 is generated by TDM logic 218 and multiplexed into memory 240 as part of subpacket 310A. Similarly, byte 304B representing Ch-1 byte-1 is generated by TDM logic 218 and multiplexed into ingress memory 240 as part of subpacket 312A. This process continues for each of subpackets 312A, 314A, and 316A. In the illustrative embodiment, each subpacket includes four bytes. Each byte of a subpacket contains data associated with the same source time slot within the system. For example, subpacket 310A comprises bytes 302A-D, representing bytes 0-3 of Ch-0. Subpacket 312A comprises bytes 304A-D, representing bytes 0-3 of Ch-1. Subpacket 314A comprises bytes 306A-D, representing bytes 0-3 of Ch-2, etc. Multiple subpackets for the same source time slot may be assembled in ingress data memory 240. For example, subpacket 310B comprises bytes 4-7 of Ch-0 while subpacket 312B comprises bytes 4-7 of Ch-1, etc. It will be obvious to those skilled in the arts that other size subpackets, including 4-byte, 8-byte or 16-byte, etc., subpackets may be similarly utilized.

Construction of subpackets within ingress data memory 240 continues until the current synchronization interval expires. In the illustrative embodiment TDM logic 218 generates one byte every 125 uSec which is then supplied to ingress data memory. Accordingly, the interval in which a four byte subpacket is assembled in ingress memory 240 is at least 500 uSec, which is also the duration of one synchronization interval within the synchronized domain of apparatus 200. Thereafter, the subpackets are forwarded to an ingress queue and assembled into a packet, as explained in greater detail hereinafter.

Figure 6:
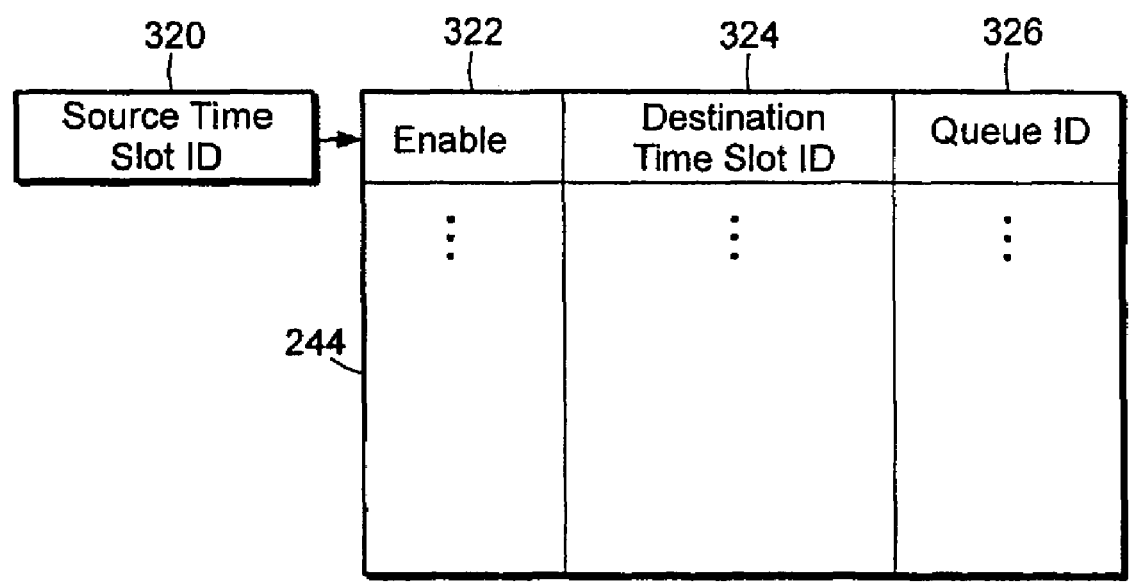
FIG. 6 illustrates conceptually the ingress context memory and the arrangement of data therein in accordance with the present invention.

SAL logic 220 further comprises an ingress context memory 244 which is used to maintain information for routing data from a source time slot to a destination time slot within network server module 206. In the illustrative embodiment, each of network server module 206A-N can accommodate up to approximately 16,000 time slots. Accordingly apparatus 200 can accommodate up to approximately 16,000×N time slots, where N is the number of network server module 206 configured within apparatus 200. A processor 228 on network server 206 maintain a server context table in ingress memory 244 which matches source time slots with destination time slots and their relative ingress/egress queues. The structure and content ingress context memory 244 is illustrated in FIG. 6. As shown, a source time slot identifier 320 associated with a subpacket of data assembled in ingress data memory 240 is used as an index into the ingress context memory 244. The source time slot identifier 320 is generated by ingress packet control logic 243. For each source time slot in the system, there is a corresponding set of associated data including an enable variable 322, a destination time slot identifier 324 and a queue identifier 326.

The data in ingress context memory 244 is written and updated by protocol software executing on a central processor within or associated with apparatus 200. The protocol software tracks and matches all time slots handled among the various network server module 206 within apparatus 200. The implementation of such protocol software being understood by those skilled in the arts and not described herein in greater detail for the sake of brevity. A processor 228 on network server module 206 accesses the context data within ingress context memory 244 for each of the subpackets that was assembled in ingress data memory 240. In the illustrative embodiment, the enable variable 322 may be implemented with a single bit, the binary value of which determines whether the data stream is to be forwarded through the rest of the system. The destination time slot identifier 324, which in the illustrative embodiment may be implemented with a binary address, identifies the time slot to which a subpacket will be written by the decoding portion of SAL logic 220 on the same or other network server module 206. The queue identifier 236 identifies one or more queues used to route a packet containing the subpackets across the asynchronous switch and may be implemented with a bit mask or a binary address.

As described herein, a plurality of subpackets relating to different of the source time slots within the system are assembled within the ingress data memory 240 during a specific synchronization interval. At the end of the synchronization interval, the subpackets are written to one of ingress queues 250A-N, under the control of ingress packet control logic 243 using an asynchronous clock signal supplied by either asynchronous switch 210 or an asynchronous signal source within the system or a master clock within the network to which apparatus 200 is connected. In this manner, the formation of the subpackets occurs in the synchronous domain, while the formation of packets 330 occurs in the asynchronous domain. Within ingress queues 250A-N, packets are formed from the subpackets received from the ingress data memory 240. In the illustrative embodiment, 32 separate ingress queues are utilized. It will be obvious to those reasonably skilled in the arts that any number of ingress queues may be used according to the designers discretion and the capacity of the asynchronous switch.

Figure 7:
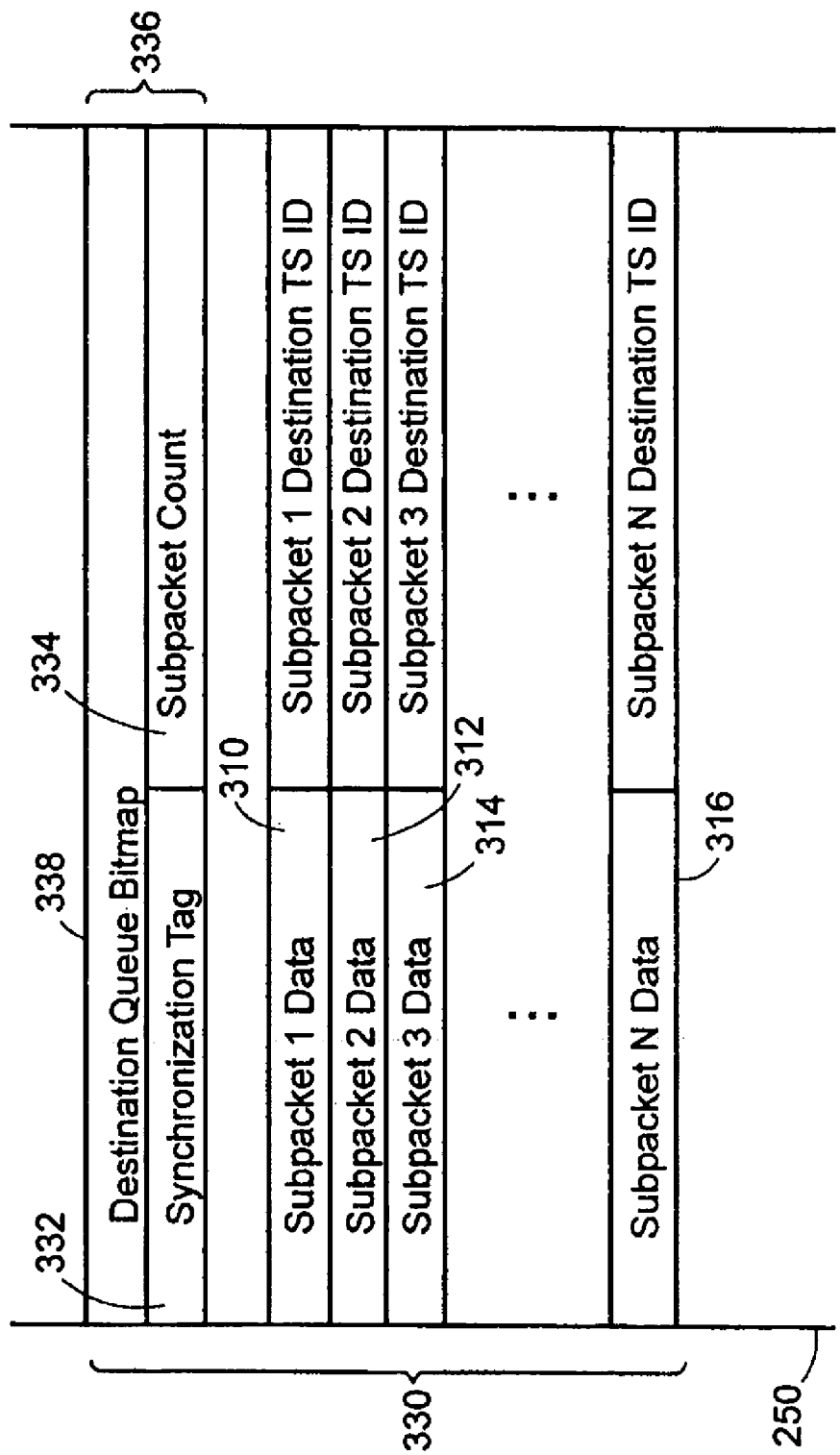
FIG. 7 illustrates conceptually the structure of an ingress queue and the arrangement of packets therein in accordance with the present invention.

FIG. 7 illustrates conceptually an ingress queue 250 and the format of a packet 330 constructed therein in accordance with the present invention. As illustrated, packet 330 comprises a plurality of subpackets 310-316 and the destination time slot identifier 324 associated with each subpacket. In addition, packet 330 includes a packet header 336 including a synchronization tag 332. The synchronization tag 332 identifies the synchronization interval in which the subpackets contained therein were generated and is used to align bytes from separate DS0 links for play out on a destination server module 206, as explained hereinafter. In addition, the packet header 336 further comprises a subpacket count variable 334 identifying the number of subpackets contained within that particular packet. In the illustrative embodiment, each packet can hold up to nine subpackets. To ensure that additional delay is not introduced when fewer than nine channels are transmitting from a given source server module to a destination server module, any unfilled packets are forwarded at the end of synchronization interval. The subpacket count contained in each packet header allows the destination server module to determine if a packet is full and, if not, how many subpackets are contained therein. When the ninth subpacket is written into the packet 330, the packet header is updated to indicate the number of subpackets contained therein. In the illustrative embodiment, all subpackets in packet 330 were generated within the same synchronization interval, e.g. each 500 uSec window. A packet timer, such as a hold down timer, associated with the ingress queue 250 may be used to force any unfilled packets to be forwarded to asynchronous switch 210 before receiving subpackets from a new synchronization interval. In this manner, a packet will only contain subpackets from a single synchronization interval. The packet header 336 further comprises a destination queue bitmap 338 which identifies to which port of asynchronous switch 210 the packet will be routed.

Following the construction of a packet 330 within one of ingress queues 250A-N, the packet is sent asynchronously via switch interface 230 on the source server module 206 to a first port of switch 210. Packet 330 is then routed through the fabric of asynchronous switch 210 to a second port thereof. The packet is then passed through another switch interface 230 on the destination server module 206 and to an egress queue 254 contained thereon. Conceptually the structure of an egress queue 254 and the arrangement of a packet 330 therein is substantially similar to ingress queue 250 described with reference to FIG. 7. Packet 330 is disassembled within egress queue 254 and the subpackets contained therein asynchronously written into egress data memory 260 via multiplexer 258 operating under control of egress packet control logic 257 and control logic 255. In the illustrative embodiment, control logic 257 may be implemented as a hardware state-machine that enables the writing of subpackets from egress queue 254 into egress data memory 260.

Figure 8:
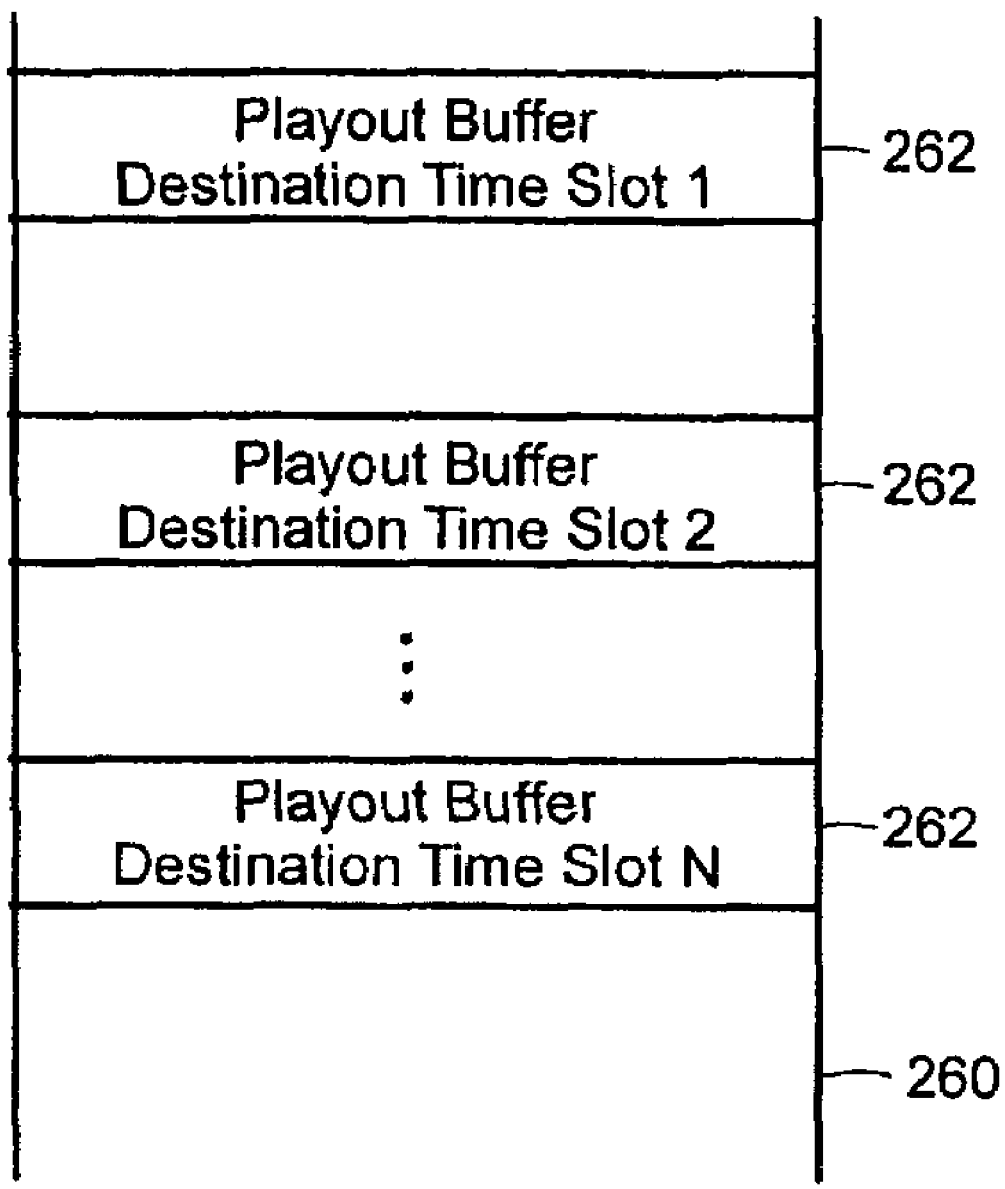
FIG. 8 illustrates conceptually the structure of an egress memory and contents in accordance with the present invention.

FIG. 8 illustrates conceptually the structure and content of egress memory 260. In the illustrative embodiment, egress data memory 260 is implemented with a pair of dual port RAMs. It will be obvious to those reasonably skilled in the arts that memory 260 may be implemented with a single partitioned memory or multiple memory devices. Egress TDM control logic 256 determines from the context information associated with a subpacket in packet 330 where in the egress data memory 260 the subpacket will be written. Memory 260 includes a partitioned area for each of the time slots present within the systems. Such partitioned areas are referred to herein as "play-out" buffers 262A-N within egress memory 260. In the illustrative embodiment, egress data memory 260 is implemented with a pair of dual port data RAMs. It will be obvious to those reasonably skilled in the arts that memory 260 may be implemented with a single partitioned memory or multiple memory devices.

Figure 9:
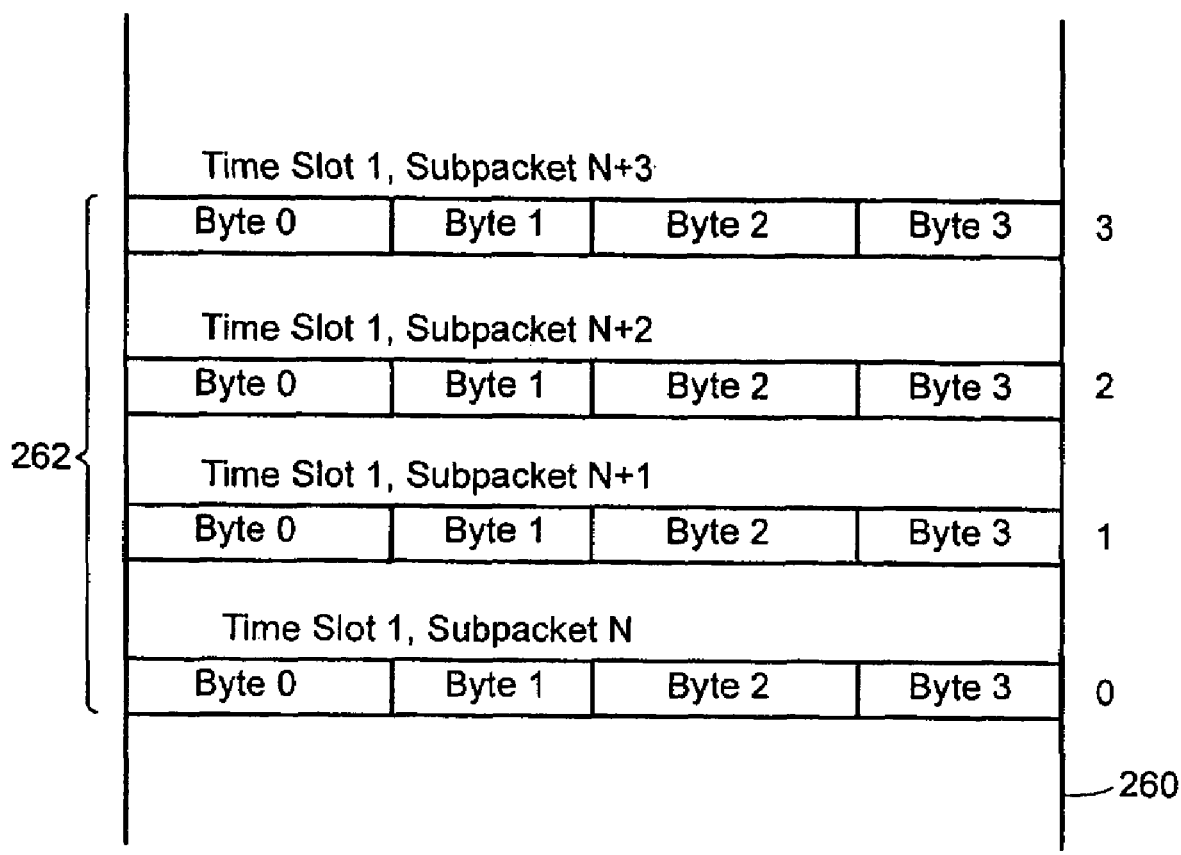
FIG. 9 illustrates conceptually the structure of a play out buffer and the arrangement of data therein in accordance with the present invention.

FIG. 9 illustrates conceptually the structure of a play-out buffer 262 and the arrangement of data therein in accordance with the present invention. Within each play-out buffer 262 are specific locations or synchronization positions, one for each of the synchronization intervals generated by synchronization logic 208. In the illustrative embodiment, the play-out buffer 262 associated with each destination time slot holds four subpackets, each played out during a separate synchronization interval. Accordingly, the play out buffer has capacity for four synchronization intervals of play out data.

All packets generated in accordance with the present invention are stamped with a two-bit synchronization tag indicating the synchronization interval in which the subpackets were generated. The value of the synchronization tag wraps after it has reached a fixed value, e.g. 3 (0, 1, 2, 3, 0, 1, ... ). The synchronization tag is used to determine which of the subpackets contain bytes that were received at the same time. Because of the synchronization clock signal supplied by logic 208, the play out buffer location that was being read from at the time the subpacket was generated is known, i.e. a reference synchronization interval. The use of a synchronization tag at the source eliminates the need for context at the destination. Egress control logic 256 utilizes the synchronization tag associated with packet 330 to determine into which of the synchronization positions within a particular play-out buffer the subpacket will be written.

Subpackets are queued within a play out buffer location with a fixed offset. In the illustrative, subpackets are queued into the play out buffer two synchronization intervals after the interval that was being played at the time of their reception, i.e. the value of the synchronization tag of their respective packet. This allows two synchronization intervals for the subpackets to be transmitted from the source module 206 to the destination module 206. For example, in FIG. 9, Time Slot 1, Subpackets N+2 that was constructed during synchronization interval 0 may be read into the play-out buffer 262 associated with Time Slot 1 in the position associated with synchronization interval 2, i.e., two synchronization intervals later. Similarly, Time Slot 1, Subpackets N+3 that was constructed during synchronization interval 1 may be read into the play-out buffer 262 associated with Time Slot 1 in the position associated with synchronization interval 3, i.e., two synchronization intervals later. In this manner, the data is transmitted across the asynchronous medium, e.g. the switch, with a known delay of two synchronization intervals. It will be obvious to those reasonably skilled in the art that the synchronization interval offset may be chosen to accommodate the delay through the apparatus 200. This fixed offset delay may be set to the minimum value that prevents under run of the play out buffer due to system variation in moving the data from a source server module to a destination server module. Such a technique further ensures that data received from one DS0 channel will be aligned with the data received at the same time from another DS0 channel when played out by the TDM logic 218 on a destination server module 206.

Subpackets from play-out buffers 262A-N of egress memory 260 are synchronously read into TDM logic 218 under the control of egress control logic 256. In the illustrative embodiment, egress TDM control logic 256 may be implemented as a state-machine in hardware that utilizes counters to sequentially generate the appropriate indices or memory addresses for the playout buffers 262 in egress memory 260 so that a subpacket for every time slot, e.g. every playout buffer 262, within network server 206 is readout every synchronization interval.

As illustrated in FIG. 4, each TDM logic 218B and 218D includes a plurality of registers 236A-N in sequence, respectively, with parallel-to-serial converters 234A-N. Each sequential pair of registers 236 and converters 234 of TDM logic 218B is connected TDM logic 219. TDM logic 218B converts each of the parallel data units or bytes from egress memory 260 into a serialized synchronous data stream which is supplied to data framers TDM logic 219. Each sequential pair of registers 236 and converters 234 of TDM logic 218D is connected PAD logic 212. TDM logic 218D converts each of the parallel data units or bytes from egress memory 260 into a serialized synchronous data stream which is supplied to the DSP in PAD logic 212 for further forwarding.

Figure 10A:
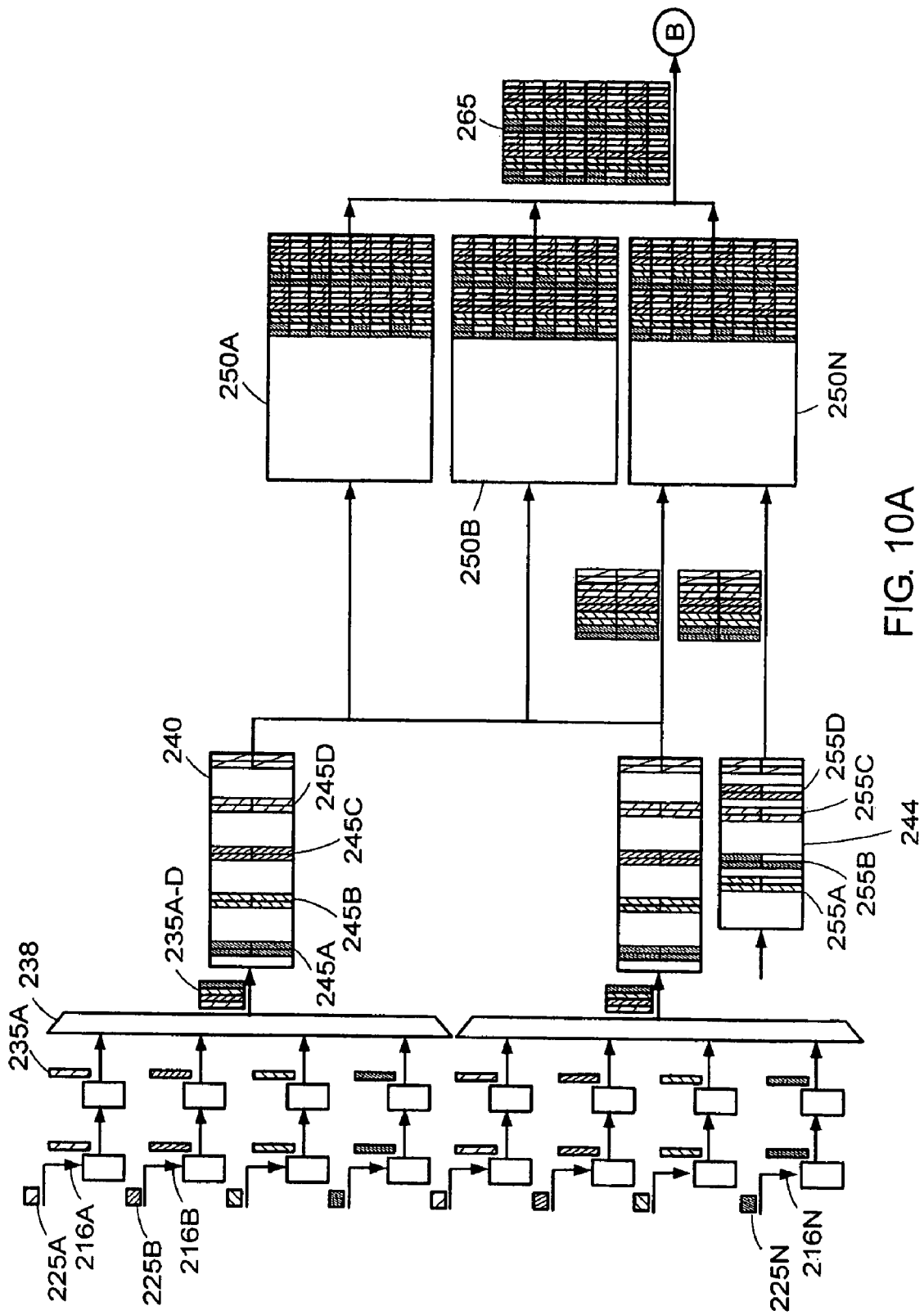
FIG. 10A illustrates conceptually the conversion of serial time division multiplexed data into packets in accordance with the present invention.
Figure 10B:
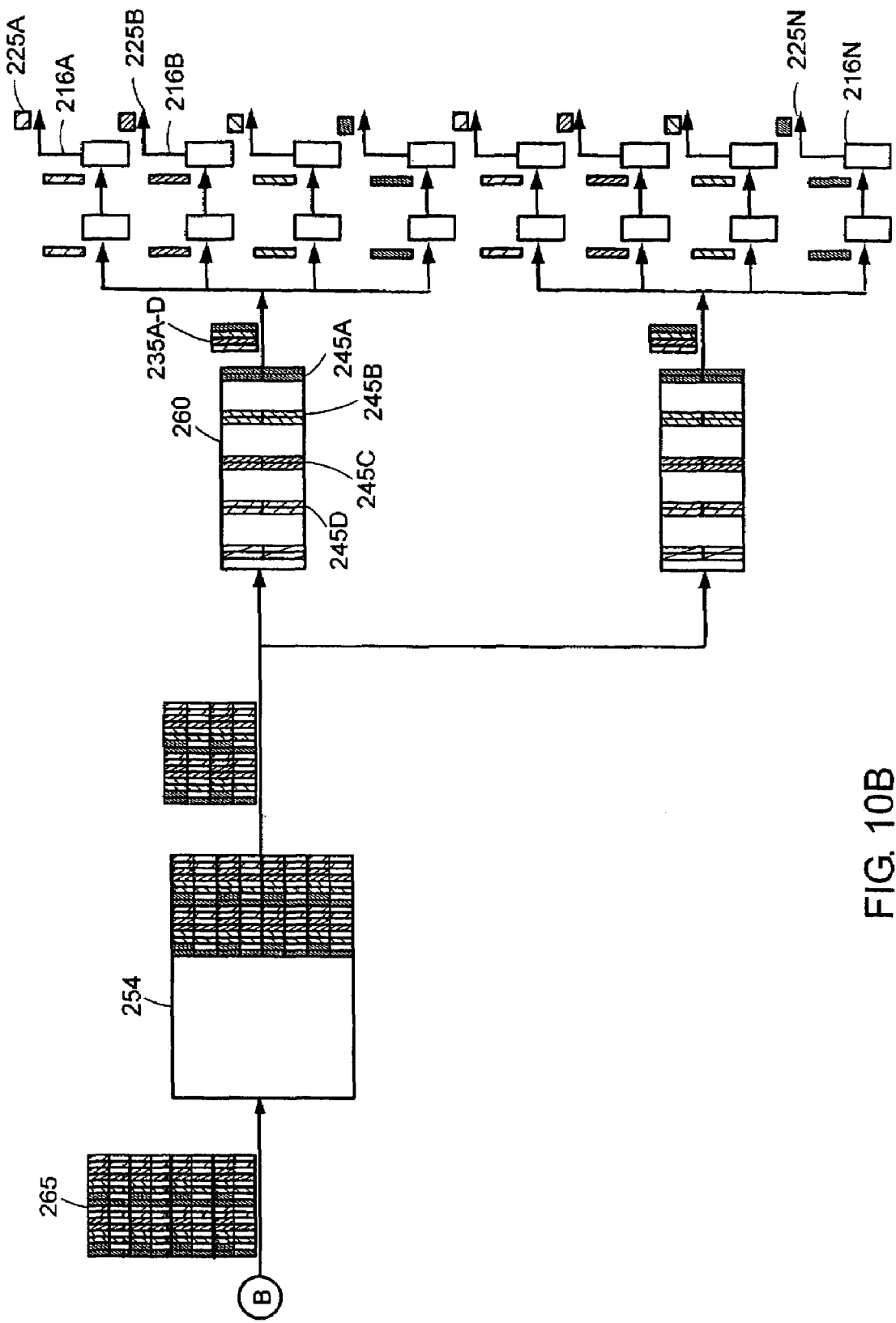
FIG. 10B illustrate conceptually the conversion of packetized data into serial time division multiplexed data in accordance with the present invention.

Having described in detail the functional elements of apparatus 200 and server modules 206, FIGS. 10A-B illustrate conceptually the protocol in accordance with the present invention. The protocol entails conversion of a serial time division multiplexed data from a source time slot into packets, transmission of the packets across an asynchronous medium, and reconversion of the packetized data into serial time division multiplex data for supplying to a destination time slot. As noted previously herein, in the contemplated system, there may be a multitude of time slots, with each DS0 link on a server module 206 accommodating the serialized data from multiple source time slots.

In FIG. 10A, multiple streams of serial synchronous data 225A-N, representing an even larger number of source time slots, are received by DS0 links and converted by TDM logic 218A and 218C into parallel data units or bytes 235A-D in DS0 byte format. Bytes 235A-D are then multiplexed into an ingress data memory 240 where the bytes relating to a source time slot are assembled into a subpackets 245A-D. As explained previously, multiple subpackets are constructed simultaneously within a synchronization interval allowing the ingress data memory 240 to serve as per time slot subpacket buffers. Ingress context memory 244 stores context data 255A-D, including control and routing information, associated with a subpacket 245A-D, respectively. Subpackets 245A-D assembled in ingress data memory 240 during the prior synchronization interval are forwarded asynchronously, along with their respective ingress context data 255A-D, to one of ingress queues 250A-N where the subpackets are formed into a packet 265, e.g., a fixed length packet. The queue identifier in the context associated with a subpacket is used to determine into which of ingress queues 250 A-N the subpacket is written. If the enable bit in the context associated with a subpacket is not enabled, the data is discarded. Each packet 265 has associated therewith data identifying the synchronization interval in which the subpackets contained therein were created, e.g. a synchronization tag, and data identifying the number of subpackets contained within the packet. Each of the ingress queues 250 A-N produces packets that are sent to different ports of asynchronous switch 210.

Referring to FIG. 10B, the asynchronous switch 210 forwards the packet 265 to appropriate egress queue 254 of the destination server module 260 based on the destination bit-map contained in the header of packet 265. The synchronous aggregation logic on the destination server module examines the packet count value and synchronization tag of the packet header to determine the number of subpackets 245 contained therein and the synchronization interval during which the subpackets were generated. The destination time slot identifiers for each subpacket are examined by the egress control logic. Based on these values, the subpackets 245A-D from packet 265 are then written to the correct play out buffer location within egress memory 260. One byte 235 for each time slot is read from the play out buffer for each 125-usec frame and is then sent onto the decoding section of TDM logic 218 of the destination server module for parallel to serial conversion and transmission onto DS0 links.

Note that the conversion of the synchronous serial data streams into bytes and the formation of subpackets therefrom occurs using the synchronization clock generated by synchronization logic 208. Thereafter transference of the subpackets to the ingress queues, formation of packets within the ingress queues, transmission of packets through the asynchronous switch, transference of the packets to an egress queue, and transference of the subpackets to playout buffers, all occur asynchronously using a asynchronous clock. Therafter play out of the subpackets from playout buffers and reconversion of the bytes within a subpacket into synchronous serial data occurs occurs using the synchronization clock generated by synchronization logic 208. Accordingly, the protocol facilitated by the apparatus 200 described herein enable synchronous data to be formatted, transported across an asynchronous medium and reformatted with a fixed delay to maintain synchronicity with the system.

The data flow path described above may have several variations in the inventive apparatus 200. For example, if the subpackets are to remain packetized for transmission to a packet network, such as an ATM network, the data will be supplied instead to the PAD logic 212 and packet interface 214 for transmission to asynchronous network 204. Also, as illustrated in FIG. 4, a packet 330 output from one of the ingress queues 250N may be transmitted directly to egress queue 254 without being transmitted through asynchronous switch 210. This data transmission path may be utilized in instances where the source time slot and the destination time slot are being serviced within apparatus 200 by the same network server module 206. Since the delay required to transmit the packet across asynchronous switch 210 is not necessary, the subpackets within the packet will be transmitted directly to egress queue 254 and clocked into egress memory 260 and the respective play-out buffers contained therein with the same fixed-offset delay as if the packet had been routed through asynchronous switch 210 to prevent the data from losing synchronization with other subpackets generated during the same synchronization interval.

Ingress TDM Control State Machine Logic

Figure 11:
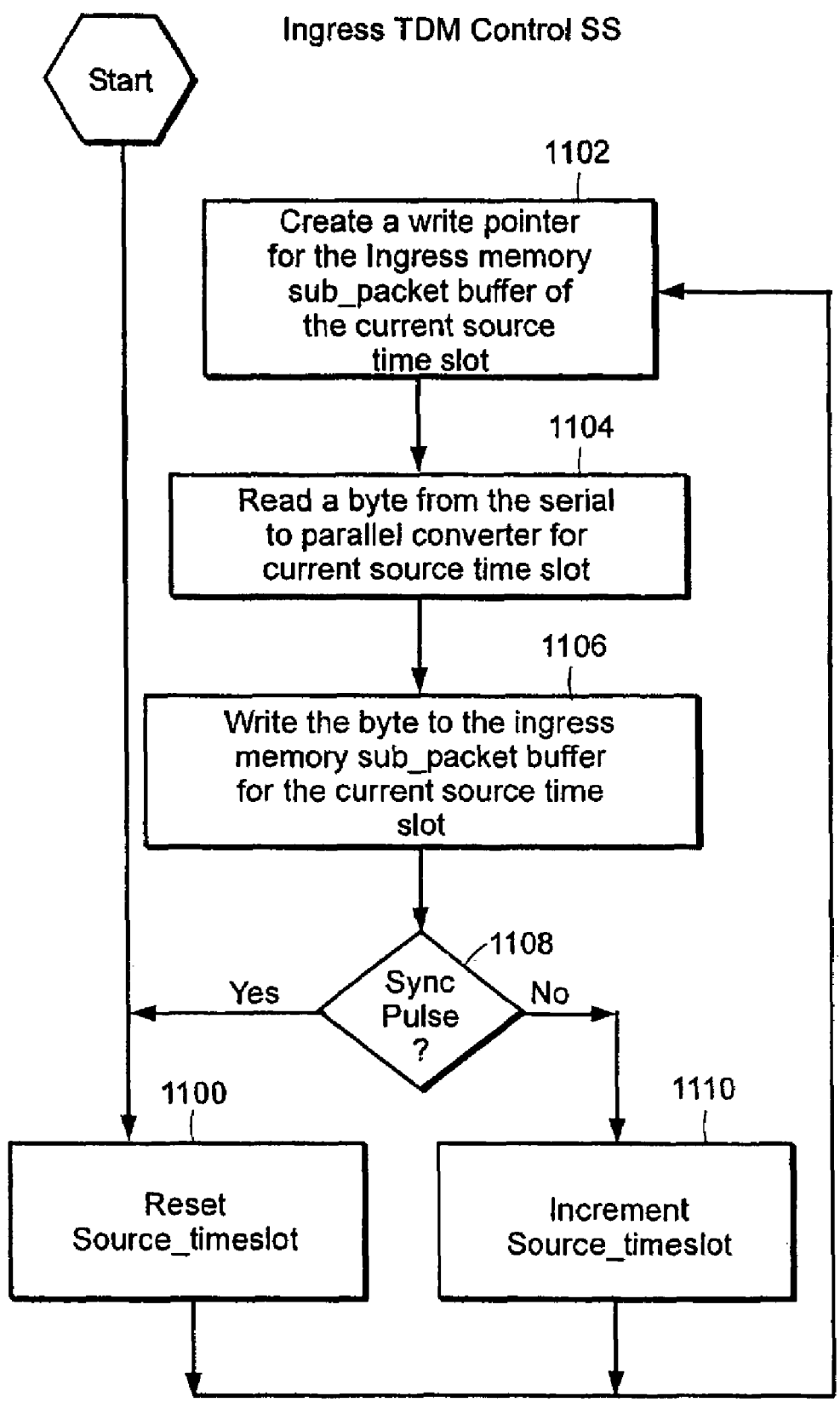
FIG. 11 is a flowchart illustrating the process performed by the Ingress TDM Control State Machine logic of FIG. 4.

FIG. 11 is a flowchart illustrating the process performed by the ingress TDM control state machine logic 242 of FIG. 4. Logic 242 may be implemented to perform such functionality with a number of logic configurations, including with custom design ASIC array(s), field programmable gate arrays, a combination digital logic and ROM instruction store, or completely with a combination of small, medium and large scale logic, as chosen by the system designer to obtain the functional behavior described with reference to FIG. 11. Referring to FIG. 11, upon initialization or reset of the apparatus 200, the source time slot counter 270 is reset to zero, as illustrated by procedural step 1100. The source time slot counter 270 may be implemented as either an up or down counter in the ingress TDM control sate machine logic 242 illustrated in FIG. 4. The source timeslot counter counts from zero to approximately 16,384 and may wrap sixteen times between synchronous pulses generated by the synchronous logic 208. Next, using the address generated by the source time slot counter 270, the logic 242 generates a write address into one of the RAMs in ingress data memory 240 for the subpacket of the current source time slot, as illustrated by procedural step 1102. A byte of data is read from the serial to parallel converter in one of the TDM logic modules 218 associated with the current source timeslot, as illustrated in procedural step 1104, and written into the ingress data memory 240 at the address generated for the current time slot, as illustrated by procedural step 1106. In the illustrative embodiment, synchronous pulses may occur approximately every 2 milliseconds. If a synchronous pulse occurs, as illustrated by decisional step 1108, the source timeslot counter is reset, similar to step 1100. Otherwise, the source times lot counter 270 is incremented, as illustrated by procedural step 1110, and process steps 1102-1108 occur as described previously, until a the next synchronous pulse is detected by logic 242.

Ingress Packet Control State Machine Logic

Figure 12:
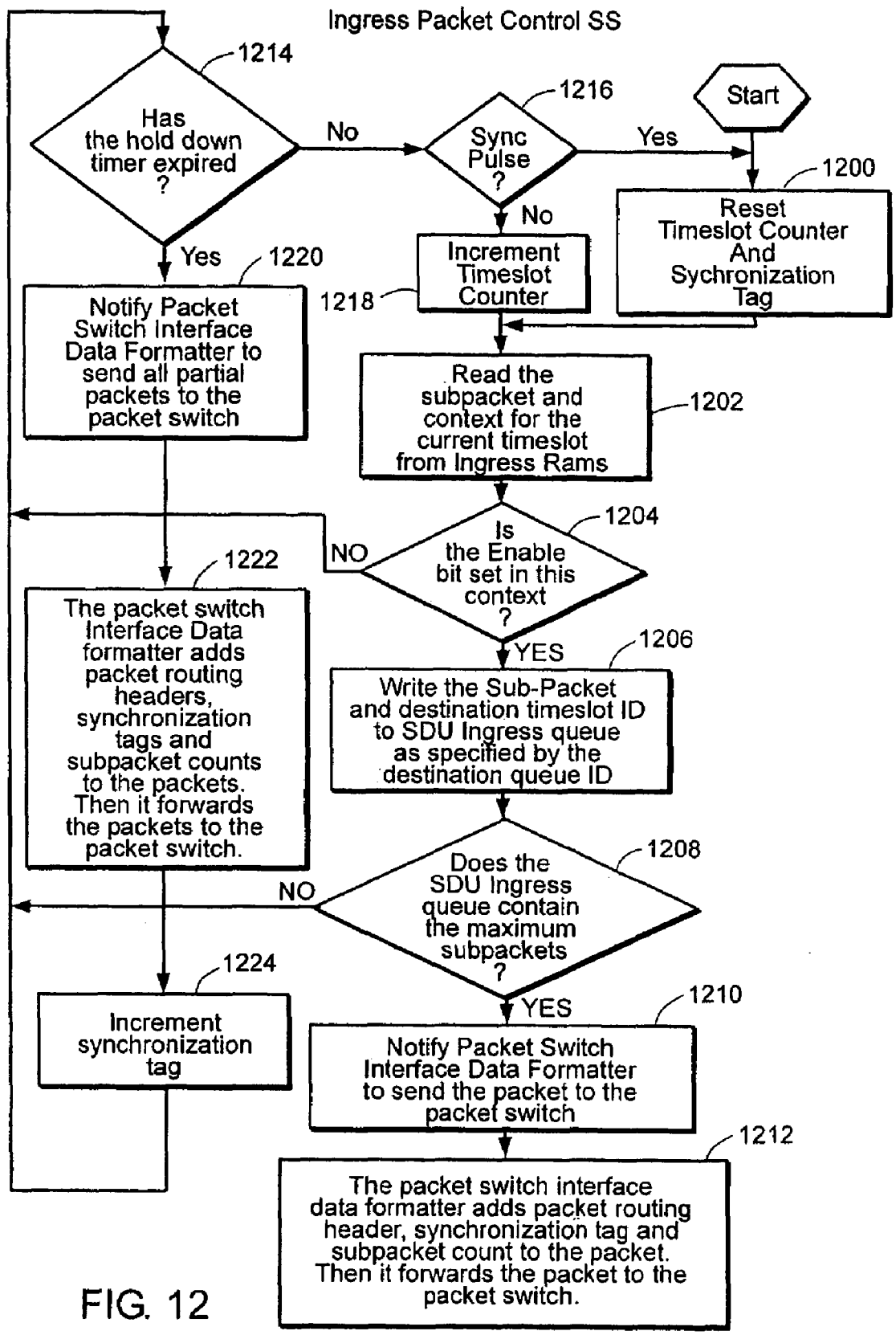
FIG. 12 is a flowchart illustrating the process performed by the Ingress Packet Control State Machine logic of FIG. 4.

FIG. 12 is a flowchart illustrating the process performed by the ingress packet control state machine logic 243 of FIG. 4. Logic 243 may also be implemented to perform such functionality with a number of logic configurations, including with custom design ASICS array(s), field programmable gate arrays, a combination digital logic and ROM instruction store, or completely with a combination of small, medium and large scale logic to obtain the functional behavior described with reference to FIG. 12. To begin, logic 243 resets a subpacket counter and synchronization tag to zero, as illustrated by procedural step 1200. Next, logic 243 reads the subpacket and context from the ingress data RAM 240 and context RAM 244, as illustrated by procedural step 1202. Next, logic 243 determines whether the enable bit is set in the context for the current time slot, as illustrated by decisional step 1204. If the enable bit within the context is set, indicating that the data is valid, the subpacket of data and destination time slot ID are written to one of the SDU ingress queues 250, as specified by the destination queue ID, and as illustrated by procedural step 1206. Note that the destination time slot ID and destination queue ID for a particular subpacket are part of the context stored in context RAM 244 associated with a particular subpacket for the current timeslot. Next, the state machine logic 243 determines whether the SDU ingress queue contains the maximum number of subpackets, as illustrated by decisional step 1208. If so, state machine logic 243 notifies that packet switch interface data formatter 230 to send the packet from the SDU ingress queue to the packet switch 210, as illustrated by procedural step 1210. Next, the packet switch interface data formatter 230 adds a packet routing header, synchronization tag and subpacket count to the packet and then forwards the packet to the packet switch 210, as illustrated by procedural step 1212. In the illustrative embodiment, note that the step 1212 is not performed by logic 243 but interface data formatter 230. Thereafter, the ingress packet control state machine logic 243 determines whether a hold-down timer, as maintained therein, has expired, as illustrated by decisional step 1214. In the illustrative embodiment, such hold-down timer counts for 500 microseconds. If not, logic 243 determines if a synchronous pulse has been received, as illustrated by decisional step 1216. If a synchronous pulse has been received, the subpacket counter and synchronization tag are reset, in the same manner as described with reference to procedural step 1200, and the process begins again. If, in decisional step 1216, no synchronous pulse was received, the subpacket counter is incremented, as illustrated by procedural step 1218, and the process advances to procedural step 1202, as previously described, for reading of a subpacket and context from the ingress data RAM 240 and context RAM 244, respectively.

If in decisional step 1214, the hold down timer had expired, control state machine logic 243 notifies packet switch interface data formatter 230 to send all partial packets to switch 210, as illustrated by procedural step 1220. Thereafter, the packet switch interface data formatter 230 adds a packet routing header, synchronization tag and subpacket count to each of the packets and forwards the packets to the packet switch 210, as illustrated in procedural step 1222 and similar to procedural step 1212. Next, the synchronization tag counter is incremented, as illustrated in procedural step 1224. Thereafter, the process returns to decisional step 1214 to determine if the hold down timer has expired.

If in decisional step 1204, logic 243 determined that the enabled bit was not set within the context associated with a subpacket for a current time slot, the process then proceeds to decisional step 1214 to determine if the hold down timer had expired. Further, if in decisional step 1208, logic 243 determined that an SDU ingress queue 250 did not contain the maximum number of subpackets, the process again advances to decisional step 1214 to determine if the hold down timer had expired.

Ingress packet control state machine logic 243 performs the functional algorithm described with reference to FIG. 12 to assure that subpackets for time slots and their associated context are orderly assembled into the ingress queues 250 and forwarded to the packet switch data formatter 230 in a synchronized matter, as described herein.

Egress Packet Control State Machine Logic

Figure 13:
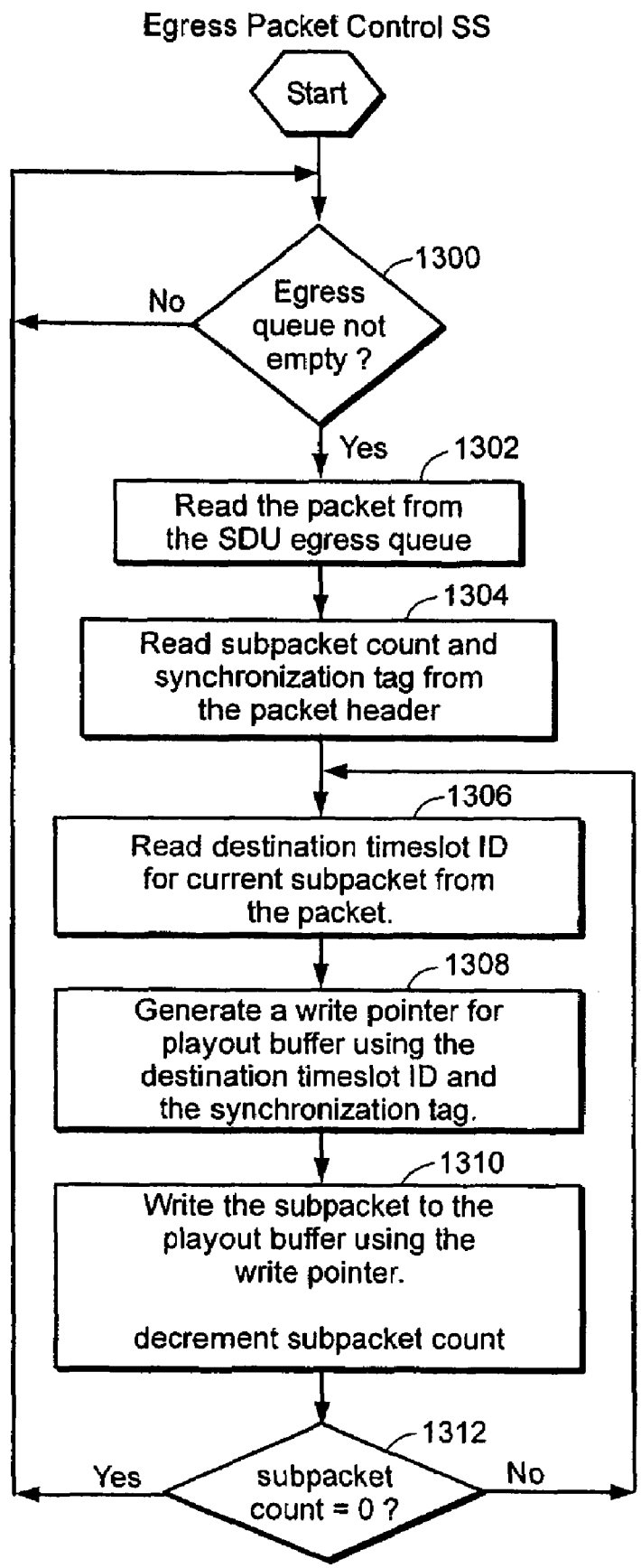
FIG. 13 is a flowchart illustrating the process performed by the Egress Packet Control State Machine logic of FIG. 4.

FIG. 13 is a flowchart illustrating the process performed by the egress packet control state machine logic 257. Logic 257 may be implemented to perform such functionality with a number of logic configurations, including with custom design ASICS array(s), field programmable gate arrays, a combination digital logic and ROM instruction store, or completely with a combination of small, medium and large scale logic to obtain the functional behavior described with reference to FIG. 13. To begin, state machine logic 257 determines when a packet is ready, for example when an egress queue is not empty, as illustrated by decisional step 1300. If a packet is ready, the packet is read from the SDU egress queue 254, as illustrated by procedural step 1302. The egress control state machine logic 257 reads the subpacket count and synchronization tag from the packet header, as illustrated by procedural step 1304. Next, the logic 257 reads the destination time slot ID for the current subpacket of the packet, as illustrated by procedural step 1306. Next, state machine logic 257 generates a write address for the playout buffer which exists in the egress data RAMs 260, using the destination time slot ID and synchronization tag associated with a subpacket, as illustrated by procedural step 1308. Next, the subpacket is written to the playout buffer utilizing the generated address, as illustrated in procedural step 1310. The subpacket count, as maintained by logic 257, is decremented, as also illustrated by procedural step 1310. Thereafter, state machine logic 257 determines whether the subpacket count is equal to zero, as illustrated by decisional step 1312. If the subpacket count is not equal to zero, the process returns to step 1306 where the destination time slot ID for a current subpacket is read from the packet and process proceeds as previously described with reference to procedural steps 1306-1312. If, in decisional step 1312, the subpacket count equals zero, the process returns to decisional step 1300 to determine whether a packet is ready. Also, if in decisional step 1300 a packet was not ready, the process remains in a decisional loop until a packet is ready, as illustrated. The state machine logic 257 which performs the functions described with reference to FIG. 13 ensures the orderly dissemination of data packets from the egress queues to the playout buffers and enables resynchronization with the system, as described herein.

Egress TDM Control State Machine Logic

Figure 14:
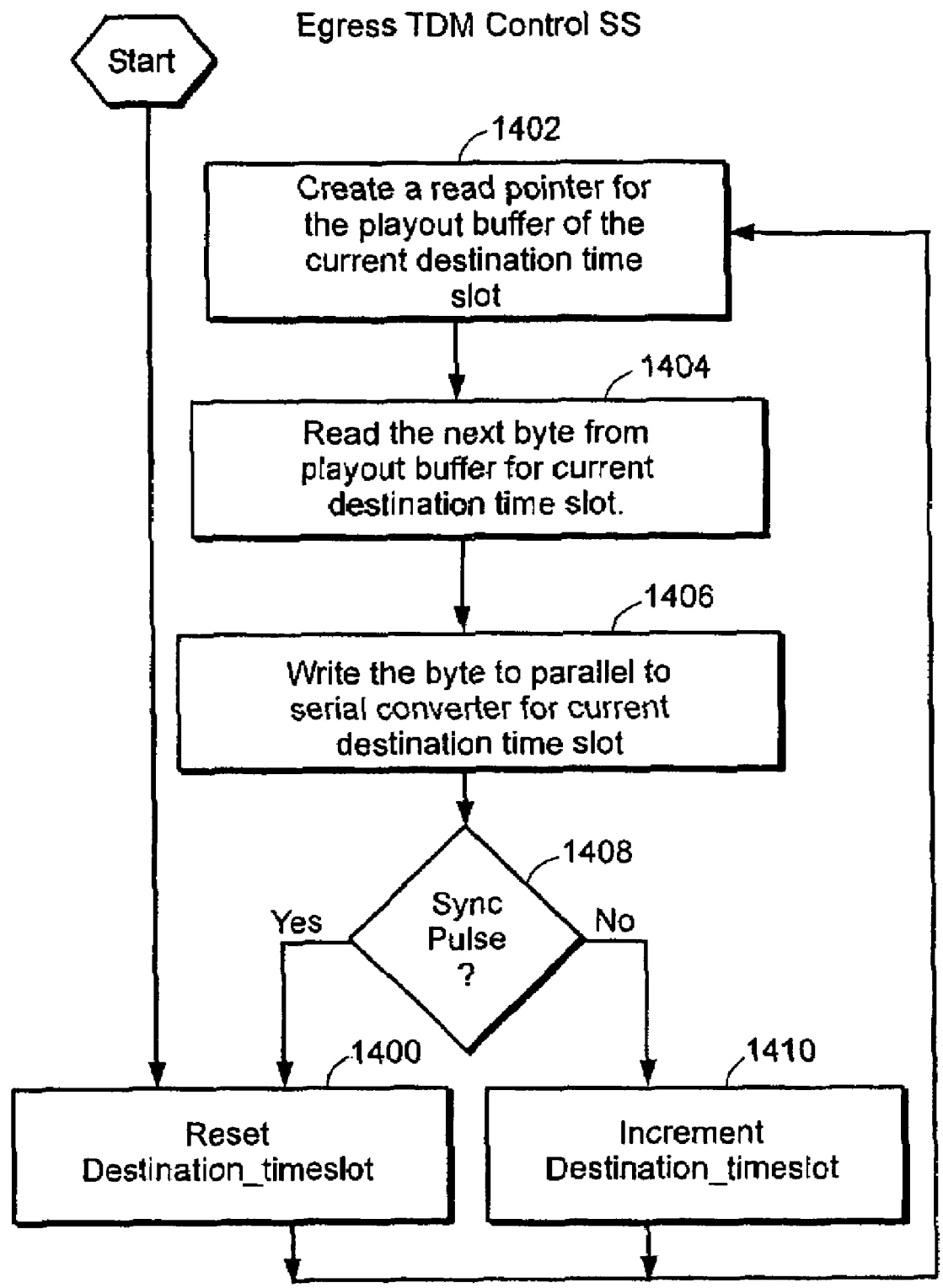
FIG. 14 is a flowchart illustrating the process performed by the Egress TDM Control State Machine logic of FIG. 4.

FIG. 14 is a flowchart illustrating the process performed by the egress TDM control state machine logic 256 of FIG. 4. Like logic 242, logic 256 may be implemented to perform such functionality with a number of logic configurations, including with custom design ASICS array(s), field programmable gate arrays, a combination digital logic and ROM instruction store, or completely with a combination of small, medium and large scale logic to obtain the functional behavior described with reference to FIG. 14. Referring to FIG. 14, upon initialization or reset of the apparatus 200, the destination time slot counter 275 is reset to zero, as illustrated by procedural step 1400. The destination time slot counter may implemented as either an up or down counter in the egress TDM control sate machine logic 256 illustrated in FIG. 4. The destination timeslot counter counts from zero to approximately 16,384 and may wrap sixteen times between synchronous pulses generated by the synchronous logic 208. Next, using the address generated by the destination time slot counter 275, the logic 256 generates a read address into play-out buffer 262 for the subpacket of the current destination time slot, as illustrated by procedural step 1402. A byte of data is read from the play-out buffer 262, as illustrated in procedural step 1404, and written into the parallel to serial converter in one of the TDM logic modules 218 associated with the current destination timeslot, as illustrated by procedural step 1406. In the illustrative embodiment, synchronous pulses may occur approximately every 2 milliseconds. If a synchronous pulse occurs, as illustrated by decisional step 1408, the destination timeslot counter is reset, similar to step 1400. Otherwise, the destination time slot counter 275 is incremented, as illustrated by procedural step 1410, and process steps 1402-1408 are repeated as described previously, until a the next synchronous pulse is detected by logic 256.

Benefits of SAL Over Prior Art Protocols

In light of the foregoing description, it will be apparent to that there are numerous advantages to the SAL protocol over the previously referenced AAL1 and AAL2 protocols that make it more suitable for use in synchronized transport across an asynchronous medium. For example, AAL1 and AAL2 include an element that is a "length indicator" for each subpacket and that is included in the packet (cell), thereby allowing the use of variable-sized subpackets. SAL does not use a length indicator. But instead uses fixed-size sub-packets and to avoid the need to send a subpacket length indicator. Avoiding the length indicator increases the bandwidth efficiency and simplifies the mux/demux design. Fixed-size subpackets also have the benefit in the preferred embodiment of putting all the connection identifiers at the front of the packet, so they can be processed more easily. Fixed-size subpackets are more efficient for transporting constant bit rate data streams (DS0s).

The AAL2 protocol depends on splitting a subpacket among two packets. SAL does not support splitting of subpackets among packets, but instead uses fixed-size subpackets that fit completely within a packet. By avoiding the splitting of subpackets among packets, the SAL protocol avoids the overhead of the sub-packet header for the fragment in the second packet.

In addition, in the AAL1 protocol cells do not allow multiplexing of multiple connections within a cell, i.e., no subpackets. SAL does support multiple connections (subpackets) within a cell (packet), allowing for greater bandwidth efficiency and lower delay.

Like SAL, both AAL1 and AAL1-DBCES supports multiplexing of fixed-size sub-packets within ATM cells. However all of the subpackets must correspond to the time slots of one structured DS1/E1 N×64 kbit/s connection. In AAL1-DBCES, the active timeslots present within the DS1/E1 structure are indicated by a bitmask sent in the AAL1 cell. In AAL1, the ATM VCC identifier uniquely corresponds to the DS1/E1 structure. Accordingly, the subpackets all belong to the same N×64 kbit/s connection. Conversely, SAL provides connection identifiers for each subpacket, allowing the synchronous multiplexing of any connection within the same packet or packets generated during the same synchronization interval. This allows SAL to support N×64 kbit/s or single DS0 switching without limiting how many or which subpackets go into a packet. As a result, subpackets may be spread out over multiple packets-minimizing delay and maximizing bandwidth efficiency.

The protocols described in U.S. Pat. No. 5,936,967, and the AAL1 and AAL2 specifications are intended for wide area applications. Conversely, SAL is optimized for use within a local system and facilitates switching across a local asynchronous medium. SAL can be used over a wide area network, but cannot assure the same switching delay for all connections or support N×64 kbit/s transport. SAL depends on the accurate distribution of timing information within a system by the synchronization logic 208. The skew (differential delay) and jitter (delay variation) of the synchronization clock signal must everywhere be within the synchronization interval to assure known constant and same delay among connections. For example, using SAL over a wide area network would exceed the skew and jitter tolerance, preventing subpackets of an N×64 kbit/s connection from being able to be sent in different packets.

The SAL protocol further teaches how to switch channels across the asynchronous medium (packet switch) with a known constant and same delay. The prior art allows constant delay for individual connections (via network clock, or adaptive clock or SRTS methods), but the delay is unknown and is not assured to be the same among connections. This is important within a switch, for example, to be able to switch a bundle of any N DS0 circuits across the asynchronous medium. To do this, SAL depends on the inclusion of a synchronization interval identifier, timestamp or sequence number, in each packet and depends on synchronization logic that generates and distributes synchronization (interval) signals throughout the gateway apparatus, separately from the SAL packets. If synchronization among channels were not necessary, then a sequence number would only be necessary to detect and to remain synchronized after a packet loss event.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. A method for processing data comprising:
   (a) converting streams of synchronous serial data associated with a plurality of source time slots in a time-division multiplexing frame into a plurality of parallel data units;
   (b) constructing, during a synchronization interval, subpackets in memory from the plurality of parallel data units;
   (c) storing memory context information, including a destination time slot identifier, for each subpacket associated with each of a plurality of different source time slots in a time-division multiplexing frame;
   (d) constructing a data packet in memory, the data packet including at least one synchronization tag identifying the synchronization interval, a plurality of subpackets, and the respective memory context information associated with each of the subpackets;
   (e) providing the data packet to a receiving mechanism comprising an asynchronous switch; and
   (f) transmitting from the asynchronous switch the data packet, including a plurality of subpackets, to a destination to disassemble the data packet into subpackets, each subpacket being associated with a corresponding destination time slot identifier.

2. The method of claim 1 wherein (f) comprises:
   (f1) directing a subpacket into a play-out memory buffer based on the destination time slot identifier associated with the subpacket.

3. The method of claim 1 wherein (f) comprises:
   (f1) directing a subpacket into a location within a play-out memory buffer based on the synchronization tag associated with the subpacket.

4. The method of claim 1 wherein (f) comprises:
   (f1) determining a number of subpackets contained within the packet.

5. The method of claim 1 wherein the memory context comprises time slot identification data.

6. The method of claim 1 wherein the memory context comprises destination queue identification data.

7. The method of claim 1 wherein the memory context comprises enable data for enabling a data stream.

8. The method of claim 1 wherein the packet further comprises data, identifying the number of subpackets contained therein.

9. The method of claim 1 wherein the asynchronous switch comprises a plurality of destination ports and the packet further comprises data identifying to which of the destination ports the packet will be supplied.

10. The method of claim 1 wherein (c) comprises:
    (c1) maintaining associations between a plurality of source time slot identifiers and a plurality of destination time slot identifiers.

11. A method for processing data comprising:
    (a) converting a plurality of synchronous serial data streams, each associated with a source time slot, into parallel data units;
    (b) constructing, in ingress memory, subpackets from the parallel data units associated with one of the source time slots,
    (c) retrieving ingress context data associated with each subpacket associated with each of a plurality of different source time slots, the ingress context data comprising a destination time slot identifier, a queue identifier, and an enable variable;

(d) constructing, in each of a plurality of queues, a data packet from subpackets and ingress context data associated with multiple source time slots, the subpackets within the data packet completed within a synchronization interval, the data packet further comprising i) at least one synchronization tag identifying the synchronization interval, and ii) data identifying the number of subpackets contained in the packet;
(e) upon completion of a data packet, providing the data packet to the receiving mechanism comprising an asynchronous switch; and
(f) transmitting from the asynchronous switch the data packet to a destination to disassemble the data packet into subpackets, each subpacket being associated with a corresponding destination time slot identifier.

12. The method of claim 11 wherein (c) comprises:
(c1) upon completion of a subpacket, reading from an ingress context memory the ingress context data.

13. A method for processing data comprising:
(a) providing an apparatus having synchronization logic and an asynchronous switch for routing synchronous signals among a synchronous network interface and an asynchronous network interface and synchronization logic;
(b) receiving a plurality synchronous serial data streams each from a different source time slot in a time-division multiplexing frame;
(c) constructing a data packet from a plurality of subpackets each derived from one the synchronous serial data streams and a respective memory context stored with each subpacket, wherein the respective memory context includes a destination time slot identifier for each subpacket associated with each of the different source time slots in the time-division multiplexing frame;
(d) routing the data packet through the asynchronous switch to one of the asynchronous network interface and the synchronous network interface; and
(e) transmitting from the asynchronous switch the data packet to disassemble the data packet into the plurality of subpackets, each subpacket being associated with a corresponding destination time slot identifier.

14. A method for processing data comprising:
(a) receiving a data packet from an asynchronous switch, the data packet comprising:
 a plurality of subpackets associated with a plurality of source time slots in a time-division multiplexing frame, the subpackets within the data packet completed within a synchronization interval; and
 ingress context data associated with the plurality of source time slots, the ingress context data comprising a destination time slot identifier for each subpacket associated with each of a plurality of different source time slots, the data packet further comprising
 i) at least one synchronization tag identifying the synchronization interval, and
 ii) data identifying the number of subpackets contained in the packet;
(b) writing a subpackets into one of a plurality of playout buffers within an egress memory based on context data associated with the subpacket;
(c) writing the subpacket to a position within one of the plurality of playout buffers in accordance with the synchronization interval identified by the synchronization tag plus a fixed address offset; and
(d) sequentially reading the subpackets from the playout buffer.

15. The method of claim 14 further comprising:
(e) converting the data in the subpacket into serial synchronous data.

16. The method of claim 14 wherein the context data associated with a subpacket comprises a destination time slot identifier and wherein (b) comprises:
(b1) writing a subpackets into one of a plurality of playout buffers within the egress memory in accordance with the destination time slot identifier.

17. A communications system comprising:
a network server device configured to:
 convert streams of synchronous serial data associated with a plurality of source time slots in a time-division multiplexing frame into a plurality of parallel data units;
 construct, during a synchronization interval, subpackets in memory from the plurality of parallel data units;
 store memory context information, including a destination time slot identifier, for each subpacket associated with each of a plurality of different source time slots in a time-division multiplexing frame;
 construct a data packet in memory, the data packet including at least one synchronization tag identifying the synchronization interval, a plurality of subpackets, and the respective memory context information associated with each of the subpackets; and
 provide the data packet to a receiving mechanism comprising an asynchronous switch, so that the receiving mechanism can transmit the data packet, including a plurality of subpackets, to a second network server device that disassembles the data packet into subpackets, each subpacket being associated with a corresponding destination time slot identifier.

18. A computer program product, tangibly embodied in a computer-readable storage device, the computer program product including instructions being operable to cause a computing device to:
 convert streams of synchronous serial data associated with a plurality of source time slots in a time-division multiplexing frame into a plurality of parallel data units;
 construct, during a synchronization interval, subpackets in memory from the plurality of parallel data units;
 store memory context information, including a destination time slot identifier, for each subpacket associated with each of a plurality of different source time slots in a time-division multiplexing frame;
 construct a data packet in memory, the data packet including at least one synchronization tag identifying the synchronization interval, a plurality of subpackets, and the respective memory context information associated with each of the subpackets;
 provide the data packet to a receiving mechanism comprising an asynchronous switch; and
 transmit from the asynchronous switch the data packet, including a plurality of subpackets, to a destination to disassemble the data packet into subpackets, each subpacket being associated with a corresponding destination time slot identifier.

* * * * *

UNITED STATES PATENT AND TRADEMARK OFFICE
CERTIFICATE OF CORRECTION

| | | |
|---|---|---|
| PATENT NO. | : 7,586,925 B2 | Page 1 of 1 |
| APPLICATION NO. | : 10/658352 | |
| DATED | : September 8, 2009 | |
| INVENTOR(S) | : Smith et al. | |

It is certified that error appears in the above-identified patent and that said Letters Patent is hereby corrected as shown below:

Column 1, line 7, delete "U.S. patent application Ser. No. 10/685,053" and replace it with --U.S. patent application Ser. No. 10/658,053--

In claim 8, at column 18, line 45, delete "data, identifying" and replace it with --data identifying--

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,586,925 B2 | Page 1 of 1 |
| APPLICATION NO. | : 10/658352 | |
| DATED | : September 8, 2009 | |
| INVENTOR(S) | : Smith et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1657 days.

Signed and Sealed this

Twenty-first Day of September, 2010

David J. Kappos
*Director of the United States Patent and Trademark Office*